US011132896B2

(12) United States Patent
Sakito et al.

(10) Patent No.: US 11,132,896 B2
(45) Date of Patent: Sep. 28, 2021

(54) VEHICLE DETECTION SYSTEM AND VEHICLE DETECTION METHOD

(71) Applicant: Panasonic i-PRO Sensing Solutions Co. Ltd., Fukuoka (JP)

(72) Inventors: Rie Sakito, Saga (JP); Takeshi Wakako, Fukuoka (JP); Takahiro Yoshimura, Fukuoka (JP)

(73) Assignee: Panasonic i-PRO Sensing Solutions Co. Ltd., Fukuoka (JP)

( * ) Notice: Subject to any disclaimer, the term of this patent is extended or adjusted under 35 U.S.C. 154(b) by 49 days.

(21) Appl. No.: 16/656,318

(22) Filed: Oct. 17, 2019

(65) Prior Publication Data

US 2020/0126407 A1 Apr. 23, 2020

(30) Foreign Application Priority Data

Oct. 18, 2018 (JP) .............................. JP2018-196777

(51) Int. Cl.
    *G08G 1/01* (2006.01)
    *G08G 1/04* (2006.01)
    *G06K 9/00* (2006.01)

(52) U.S. Cl.
    CPC ....... *G08G 1/0116* (2013.01); *G06K 9/00771* (2013.01); *G06K 9/00785* (2013.01); *G08G 1/0137* (2013.01); *G08G 1/04* (2013.01)

(58) Field of Classification Search
    CPC ............. G08G 1/0116; G06K 9/00771; G06K 9/00785
    USPC ........................................................ 340/933
    See application file for complete search history.

(56) References Cited

U.S. PATENT DOCUMENTS

| 6,466,260 B1* | 10/2002 | Hatae | G08G 1/0175 348/149 |
| 6,690,294 B1* | 2/2004 | Zierden | G08G 1/052 340/933 |
| 6,970,183 B1* | 11/2005 | Monroe | G08B 7/062 348/143 |
| 7,348,895 B2* | 3/2008 | Lagassey | G07C 5/008 340/907 |
| 9,412,142 B2* | 8/2016 | Pederson | G06Q 50/265 |
| 9,638,537 B2* | 5/2017 | Abramson | G01C 21/3626 |

(Continued)

FOREIGN PATENT DOCUMENTS

JP 2007-174016 A 7/2007

*Primary Examiner* — Eric Blount
(74) *Attorney, Agent, or Firm* — Seed IP Law Group LLP

(57) ABSTRACT

A client terminal displays, on a display device, a visual feature of each of a plurality of vehicles passing through an intersection at a location where an incident occurred and map data indicating a passing direction of each of a plurality of vehicles passing through the intersection and sends, in response to a designation of any one of the plurality of vehicles, an instruction to set the designated vehicle as a tracking target vehicle to the server. When the instruction is received, a server specifies a camera of the intersection at which the tracking target vehicle is highly likely to enter next based on at least a current time and a passing direction of the tracking target vehicle at the intersection and sends camera information of the specified camera to the client terminal. When the camera information is received, the client terminal displays, on the display device, a position of a camera corresponding to the camera information to be superimposed on the map data identifiably.

17 Claims, 23 Drawing Sheets

(56) References Cited

U.S. PATENT DOCUMENTS

| | | | |
|---|---|---|---|
| 9,759,812 B2* | 9/2017 | Nichols | G08G 1/164 |
| 9,972,204 B2* | 5/2018 | Alattar | H04N 7/181 |
| 10,565,880 B2* | 2/2020 | Aoude | G06N 5/046 |
| 10,679,508 B2* | 6/2020 | Sakito | G08G 1/056 |
| 10,726,274 B1* | 7/2020 | Hasegawa | H04N 7/181 |
| 10,861,339 B2* | 12/2020 | Sakito | G08G 1/0175 |
| 10,861,340 B2* | 12/2020 | Sakito | G08G 1/056 |
| 2004/0130620 A1* | 7/2004 | Buehler | G06K 9/32 348/143 |
| 2006/0092043 A1* | 5/2006 | Lagassey | G07C 5/0891 340/907 |
| 2008/0273087 A1* | 11/2008 | Blom | G08B 13/19645 348/143 |
| 2016/0198128 A1* | 7/2016 | Wang | H04N 7/181 348/77 |

* cited by examiner

FIG. 12

VEHICLE DETECTION SYSTEM AND VEHICLE DETECTION METHOD

BACKGROUND OF THE INVENTION

1. Field of the Invention

The present disclosure relates to a vehicle detection system and a vehicle detection method for assisting detection of a vehicle or the like using an image captured by a camera.

2. Background Art

A technique is known in which a plurality of cameras are disposed at predetermined locations on a travelling route of a vehicle, and camera image information captured by the respective cameras is displayed on a display device in a terminal device mounted in the vehicle through a network and wireless information exchange device (see JP-A-2007-174016, for example). According to JP-A-2007-174016, a user can obtain a real-time camera image with a large information amount, based on the camera image information captured by the plurality of cameras disposed on the travelling route of the vehicle.

In JP-A-2007-174016 described above, it is described that the camera image information captured by the plurality of camera devices is displayed on the display device in the terminal device mounted on the vehicle, and thus a user (for example, a driver) can confirm the real-time captured image at a disposition location of each camera device. However, in JP-A-2007-174016, it is not considered that, when an event (hereinafter, referred to as an "incident or the like") such as an incident or accident occurs at a travelling route (for example, an intersection where many people and vehicles come and go) of a vehicle, a getaway route of the vehicle causing the event is narrowed down. For example, when a plurality of intersections are disposed adjacent to each other, if it is possible to narrow down the intersections where the getaway vehicle appears next to the intersection where the event occurred with a certain degree of accuracy, it is predicted to save time and effort for a route search of the getaway vehicle. Since no consideration is given to this point of view, even when the incident or the like described above occurs, even if the technique described in JP-A-2007-174016 is used, the getaway route of the getaway vehicle cannot be easily tracked and early detection of a suspect or a criminal of the incident or the like is difficult.

SUMMARY OF THE INVENTION

The present disclosure is devised in view of the circumstances of the related art described above and an object thereof is to provide a vehicle detection system and a vehicle detection method which efficiently reduces the time and effort spent on narrowing down a vehicle which has gotten away from an intersection where many people and vehicles come and go and assists early detection of a suspect or a criminal of the incident or the like when an incident or the like occurs at the intersection.

The present disclosure provides a vehicle detection system including a server connected to communicably a plurality of cameras installed at each of a plurality of intersections, and a client terminal connected to communicably the server. The client terminal displays, on a display device, a visual feature of each of a plurality of vehicles passing through an intersection at a location where an incident occurred and map data indicating a passing direction of the each of the plurality of vehicles passing through the intersection and sends, in response to a designation of any one of the plurality of vehicles, an instruction to set the designated vehicle as a tracking target vehicle to the server. When the instruction is received, the server specifies a camera of an intersection at which the tracking target vehicle is highly likely to enter next based on at least a current time and a passing direction of the tracking target vehicle and sends camera information of the specified camera to the client terminal. When the camera information is received, the client terminal displays, on the display device, a position of a camera corresponding to the camera information to be superimposed on the map data identifiably.

In addition, the present disclosure also provides a vehicle detection method implemented by a vehicle detection system which includes a server connected to communicably a plurality of cameras installed at each of a plurality of intersections, and a client terminal connected to communicably the server. The method includes displaying, by the client terminal, on a display device, a visual feature of each of a plurality of vehicles passing through an intersection at a location where an incident occurred and map data indicating a passing direction of the each of the plurality of vehicles passing through the intersection, and sending, in response to a designation of any one of the plurality of vehicles, an instruction to set the designated vehicle as a tracking target vehicle to the server. The method includes, specifying, by the server when the instruction is received, a camera of the intersection at which the tracking target vehicle is highly likely to enter next based on at least a current time and a passing direction of the intersection of the tracking target vehicle and sending camera information of the specified camera to the client terminal. The method includes, displaying, on the display device, by the client terminal when the camera information is received, a position of a camera corresponding to the camera information to be superimposed on the map data identifiably.

According to the present disclosure, when an incident or the like occurs at an intersection where many people or vehicles come and go, it is possible to efficiently reduce the time and effort spent on narrowing down a vehicle which has gotten away from the intersection, and assists early detection of a suspect or a criminal of the incident or the like.

BRIEF DESCRIPTION OF THE DRAWINGS

FIG. 12 is a diagram illustrating an example of a case screen;

FIG. 16 is an operation principle diagram of narrowing down of cameras at an intersection where the tracking target vehicle is predicted to pass through;

FIG. 17 is another operation principle diagram of narrowing down of cameras at the intersection where the tracking target vehicle is predicted to pass through;

FIG. 18 is another operation principle diagram of narrowing down of cameras at the intersection where the tracking target vehicle is predicted to pass through;

FIG. 19 is another operation principle diagram of narrowing down of cameras at the intersection where the tracking target vehicle is predicted to pass through;

DETAILED DESCRIPTION OF THE EXEMPLARY EMBODIMENT

Hereinafter, an embodiment in which a vehicle detection system and a vehicle detection method according to the present disclosure are specifically disclosed will be described in detail with reference to the accompanying drawings as appropriate. However, more detailed explanation than necessary may be omitted. For example, detailed explanations of already well-known matters and redundant explanation on the substantially same configuration may be omitted. This is to avoid the following description from being unnecessarily lengthy and to facilitate understanding by those skilled in the art. The accompanying drawings and the following description are provided to enable those skilled in the art to sufficiently understand the present disclosure and it is not intended that they limit the claimed subject matters.

Hereinafter, an example of assisting the investigation by a police officer who tracks a vehicle (that is, a getaway vehicle) on which a person such as a suspect who caused an incident (for example, an incident or an accident) or the like at an intersection where many people and vehicles come and go or a vicinity thereof rides with the vehicle detection system is described.

Figure 1:
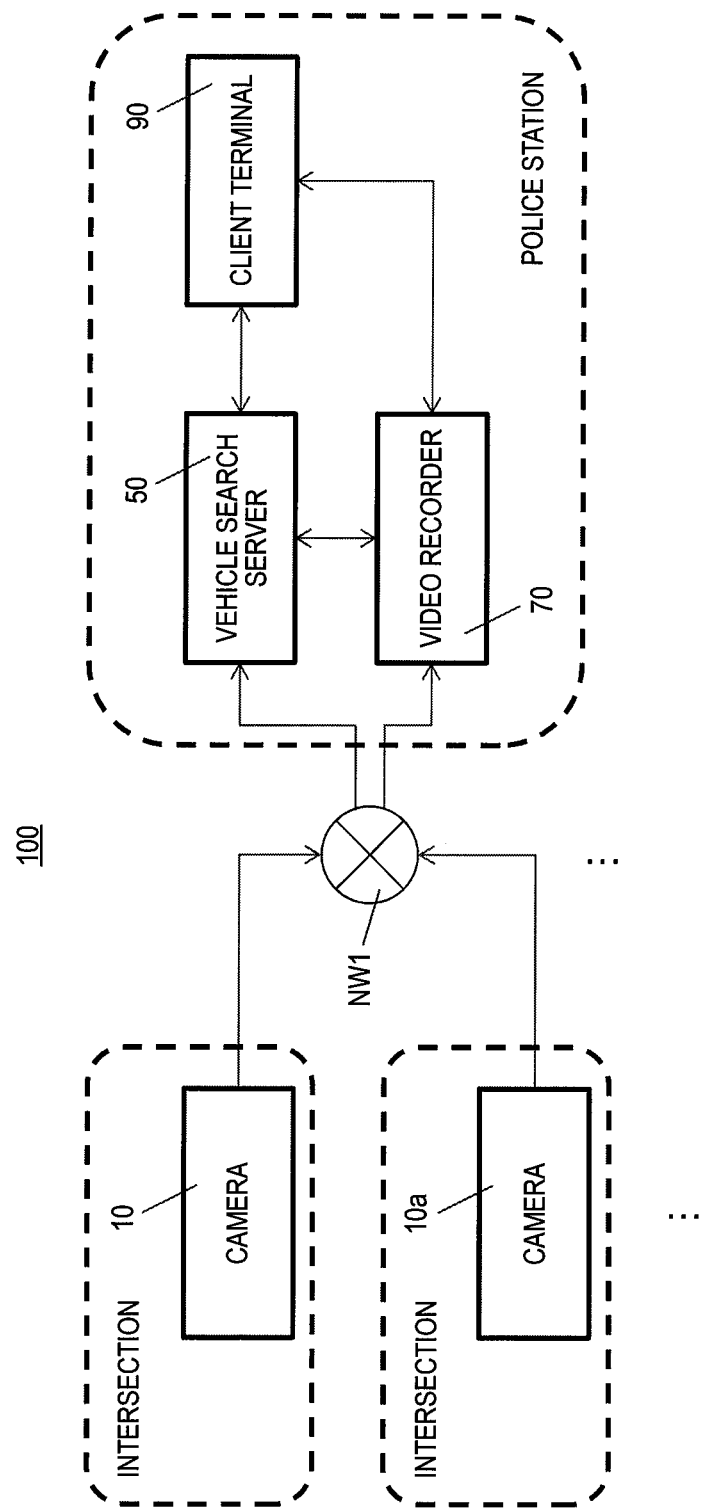
FIG. 1 is a block diagram illustrating a system configuration example of a vehicle detection system.

FIG. 1 is a block diagram illustrating a system configuration example of a vehicle detection system 100. The vehicle detection system 100 as an example of vehicle and the like detection system is constituted to include a camera installed corresponding to each intersection, and a vehicle search server 50, a video recorder 70 and a client terminal 90, the latter three elements being installed in a police station. In the following description, the video recorder 70 may be provided as an on-line storage connected to the vehicle search server 50 through a communication line such as the Internet, instead of on-premises management in the police station.

In the vehicle detection system 100, one camera (for example, camera 10) is installed for one intersection. For one intersection, a plurality of cameras (for example, cameras 10 or cameras with an internal configuration different from that of the camera 10) may be installed. Therefore, the camera 10 is installed at a certain intersection and a camera 10a is installed at another intersection. Further, the internal configurations of the cameras 10, 10a, . . . are the same. The cameras 10, 10a, . . . are respectively connected to be able to communicate with each of the vehicle search server 50 and the video recorder 70 in the police station through a network NW1 such as an intranet communication line. The network NW 1 is constituted by a wired communication line (for example, an optical communication network using an optical fiber), but it may also be constituted by a wireless communication network.

Each of the cameras 10, 10a, . . . is a surveillance camera capable of capturing an image of a subject (for example, an image showing the situation of an intersection) with an imaging angle of view set when it is installed at the intersection and sends data of the captured image to each of the vehicle search server 50 and the video recorder 70. The data of the captured image is not limited to data of only a captured image but includes identification information (in other words, position information on an intersection where the corresponding camera is installed) of the camera which captured the captured image and information on the capturing date and time.

The vehicle search server 50 (an example of a server) is installed in a police station, for example, receives data of captured images respectively sent from the cameras 10, 10a, . . . installed at all or a part of intersections within the jurisdiction of the police station, and temporarily holds (that is, saves) the data in a memory 52 or a storage unit 56 (see FIG. 6) for various processes by a processor PRC1. Every time the held data of the captured image is sent from each of the cameras 10, 10a, . . . and received by the vehicle search server 50, video analysis is performed by the vehicle search server 50 and the data is used for acquiring detailed information on the incident and the like. Further, when an event such as an incident occurs, the held data of the captured image is subjected to video analysis by the vehicle search server 50 based on a vehicle information request from the client terminal 90 and used for acquiring detailed information on the incident or the like. The vehicle search server 50 may send some captured images (for example, captured images (for example, captured images of an important incident or a serious incident) specified by an operation of a terminal (not illustrated) used by an administrator in the police station) to the video recorder 70 for storage. The vehicle search server 50 may acquire tag information (for example, person information such as the face of a person appearing in the captured image or vehicle information such as a car type, a car style, a car color, and the like) relating to the content of the image as a result of the video analysis described above, attach the tag information to the data of the captured images connectively, and accumulate it to the storage unit 56.

The client terminal 90 is installed in, for example, a police station and is used by officials (that is, a policeman who is a user in the police station) in the police station. The client terminal 90 is a laptop or notebook type Personal Computer (PC), for example. When, for example, an incident or the like occurs, from the telephone call from a notifying person who informed the police station of the occurrence of the incident or the like, a user inputs various pieces of information relating to the incident or the like as witness information (see below) by operating the client terminal 90 and records it. Further, the client terminal 90 is not limited to the PC of the type described above and may be a computer having a communication function such as a smartphone, a tablet terminal, a Personal Digital Assistant (PDA), or the like. The client terminal 90 sends a vehicle information request to the vehicle search server 50 to cause the vehicle search server 50 to search for a vehicle (that is, a getaway vehicle on which a person such as a suspect who caused the incident or the like rides) matching the witness information described above, receives the search result, and displays it on a display 94.

The video recorder 70 is installed in, for example, the police station, receives data of the captured images sent respectively from the cameras 10, 10a, . . . installed at all or a part of the intersections within the jurisdiction of the police station, and saves them for backup or the like. The video recorder 70 may send the held data of the captured images of the cameras to the client terminal 90 according to a request from the client terminal 90 according to an operation by a user. The vehicle search server 50, the video recorder 70, and the client terminal 90 installed in the police station are connected to be able to communicate with one another via a network NW2 such as an intranet in the police station.

Only one vehicle search server 50, one video recorder 70, and one client terminal 90 installed in the police station are illustrated in FIG. 1, but a plurality of them may be provided. Also, in a case of the police station, a plurality of police stations may be included in the vehicle detection system 100.

Figure 2:
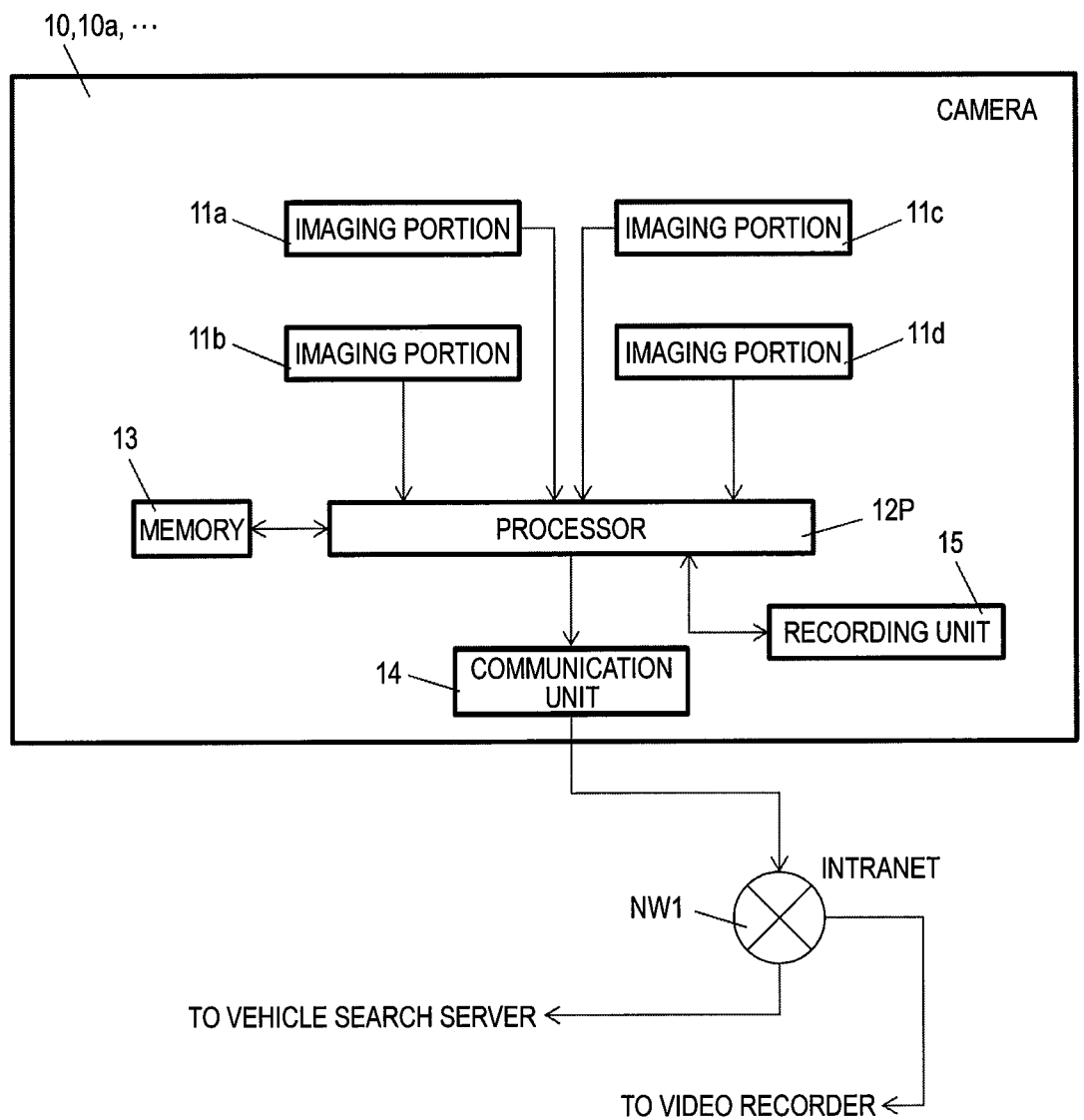
FIG. 2 is a block diagram illustrating an internal configuration example of a camera.
Figure 3:
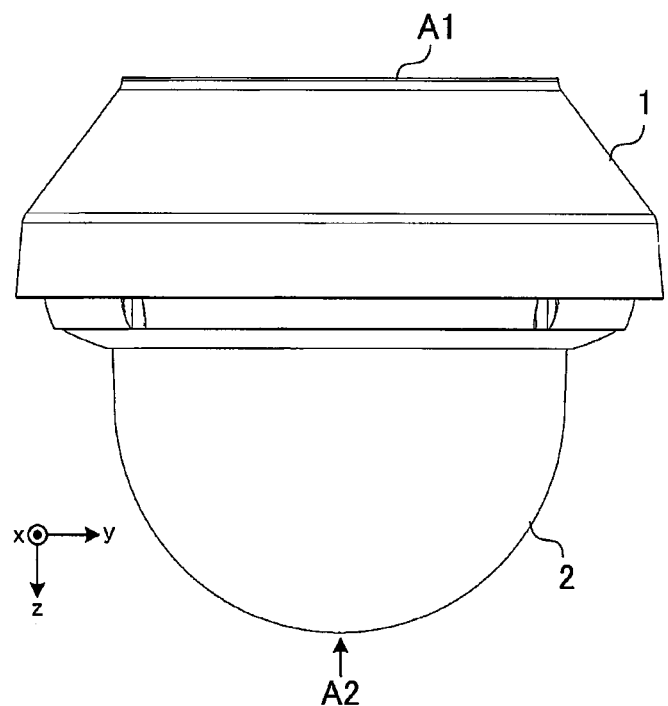
FIG. 3 is a side view of the camera.
Figure 4:
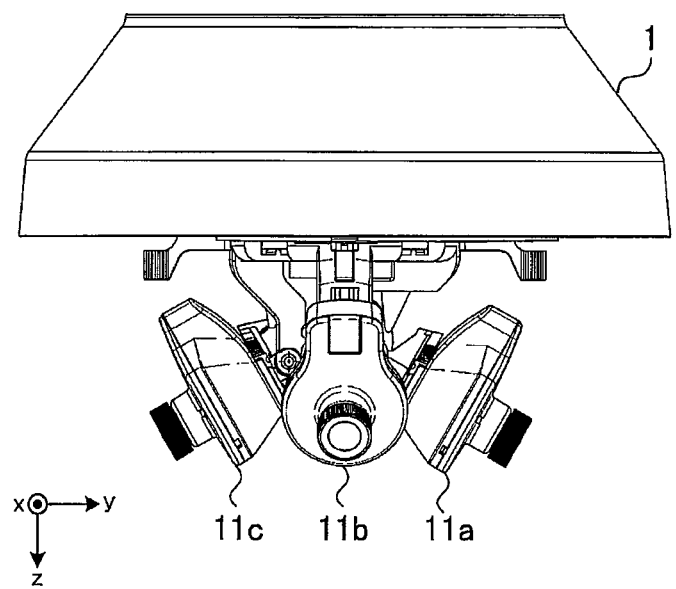
FIG. 4 is a side view of the camera with a cover removed.
Figure 5:
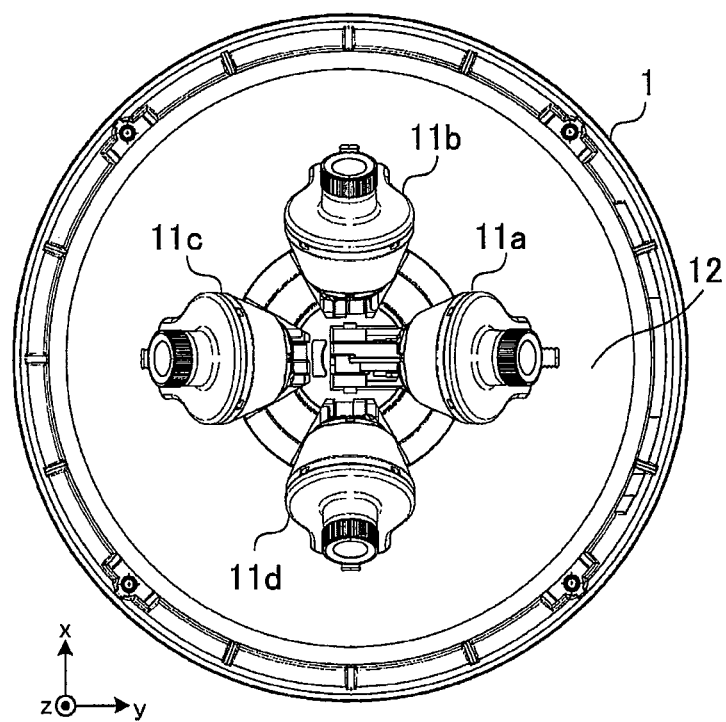
FIG. 5 is a front view of the camera with the cover removed.

FIG. 2 is a block diagram illustrating an internal configuration example of the cameras 10, 10a, . . . . As described above, the respective cameras 10, 10a, . . . have the same configuration, so the camera 10 will be exemplified below. FIG. 3 is a side view of the camera. FIG. 4 is a side view of the camera in a state where a cover is removed. FIG. 5 is a front view of the camera in a state where the cover is removed. The cameras 10, 10a, . . . are not limited to those having the appearance and structure illustrated in FIGS. 3 to 5.

First, the appearance and mechanism of the camera 10 will be described with reference to FIGS. 3 to 5. The camera 10 illustrated in FIG. 3 is fixedly installed on, for example, a pillar of a traffic light installed at an intersection or a telegraph pole. Hereinafter, coordinate axes of three axes illustrated in FIG. 3 are set with respect to the camera 10.

As illustrated in FIG. 3, the camera 10 has a housing 1 and a cover 2. The housing 1 has a fixing surface A1 at the bottom. The camera 10 is fixed to, for example, a pillar of a traffic light or a telegraph pole via the fixing surface A1.

The cover 2 is, for example, a dome type cover and has a hemispherical shape. The cover 2 is made of a transparent material such as glass or plastic, for example. The portion indicated by the arrow A2 in FIG. 3 indicates the zenith of the cover 2.

The cover 2 is fixed to the housing 1 so as to cover a plurality of imaging portions (see FIG. 4 or 5) attached to the housing 1. The cover 2 protects a plurality of imaging portions 11a, 11b, 11c, and 11d attached to the housing 1.

In FIG. 4, the same reference numerals and characters are given to the same components as those in FIG. 3. As illustrated in FIG. 4, the camera 10 has the plurality of imaging portions 11a, 11b, and 11c. The camera 10 has four imaging portions. However, in FIG. 4, another imaging portion 11d is hidden behind (that is, in a −x axis direction) the imaging portion 11b.

In FIG. 5, the same reference numerals and characters are given to the same components as those in FIG. 3. As illustrated in FIGS. 2 and 5, the camera 10 has four imaging portions 11a, 11b, 11c, and 11d. Imaging directions (for example, a direction extending perpendicularly from a lens surface) of the imaging portions 11a to 11d are adjusted by the user's hand. The housing 1 has a base 12. The base 12 is a plate-shaped member and has a circular shape when viewed from the front (+z axis direction) of the apparatus. The imaging portions 11a to 11d are movably fixed (connected) to the base 12 as will be described in detail below.

The center of the base 12 is located right under the zenith of the cover 2 (directly below the zenith). For example, the center of the base 12 is located directly below the zenith of the cover 2 indicated by the arrow A2 in FIG. 3.

As illustrated in FIG. 2, the camera 10 is constituted to include four imaging portions 11a to 11d, a processor 12P, a memory 13, a communication unit 14, and a recording unit 15. Since the camera 10 has four imaging portions 11a to 11d, it is a multi-sensor camera having an imaging angle of view in four directions (see FIG. 5). However, in the first embodiment, for example, two imaging portions (for example, imaging portions 11a and 11c) arranged opposite to each other are used. This is because the imaging portion 11a images in a wide area so as to be able to image the entire range of the intersection and the imaging portion 11c images so as to supplement the range (for example, an area where a pedestrian walks on a lower side in a vertical direction from the installation position of the camera 10) of the dead angle of the imaging angle of view of the imaging portion 11a. At least two of the imaging portions 11a and 11c may be used, and furthermore, either or both of the imaging portions 11b and 11d may be used.

Since the imaging portions 11a to 11d have the same configuration, the imaging portion 11a will be exemplified and explained. The imaging portion 11a has a configuration including a condensing lens and a solid-state imaging device such as a Charge Coupled Device (CCD) type image sensor or a Complementary Metal Oxide Semiconductor (CMOS) type image sensor. While the camera 10 is powered on, the imaging portion 11a always outputs the data of the captured image of the subject obtained based on the image captured by the solid-state imaging device to the processor 12P. In addition, each of the imaging portions 11a to 11d may be provided with a mechanism for changing the zoom magnification at the time of imaging.

The processor 12P is constituted using, for example, a Central Processing Unit (CPU), a Micro Processing Unit (MPU), a Digital Signal Processor (DSP), or a Field-Programmable Gate Array (FPGA). The processor 12P functions as a control unit of the camera 10 and performs control processing for totally supervising the operation of each part of the camera 10, input/output processing of data with each part of the camera 10, calculation processing of data, and storage processing of data. The processor 12P operates in accordance with programs and data stored in the memory 13. The processor 12P uses the memory 13 during operation.

Further, the processor 12P acquires the current time information, performs various known image processing on the captured image data captured by the imaging portions 11a and 11c, respectively, and records the data in the recording unit 15. Although not illustrated in FIG. 2, when the camera 10 has a Global Positioning System (GPS)

receiving unit, the current position information may be acquired from the GPS receiving unit and the data of the captured image may be recorded in association with the position information.

Here, the GPS receiving unit will be briefly described. The GPS receiving unit receives satellite signals including the signal transmission time and position coordinates and transmitted from a plurality of GPS transmitters (for example, four navigation satellites). The GPS receiving unit calculates the current position coordinates of the camera and the reception time of the satellite signal by using a plurality of satellite signals. This calculation may be executed not by the GPS receiving unit but by the processor 12P to which the output from the GPS receiving unit is input. The reception time information may also be used to correct the system time of the camera. The system time is used for recording, for example, the imaging time of the captured picture constituting the captured image.

Further, the processor 12P may variably control the imaging conditions (for example, the zoom magnification) by the imaging portions 11a to 11d according to an external control command received by the communication unit 14. When an external control command instructs to change, for example, the zoom magnification, in accordance with the control command, the processor 12P changes the zoom magnification at the time of imaging of the imaging portion instructed by the control command.

In addition, the processor 12P repeatedly sends the data of the captured image recorded in the recording unit 15 to the vehicle search server 50 and the video recorder 70 via the communication unit 14. Here, repeatedly sending is not limited to transmitting every time a fixed period of time passes and may include transmitting every time not only fixed period but a predetermined irregular time interval elapses, including transmitting a plurality of times.

The memory 13 is constituted using, for example, a Random Access Memory (RAM) and a Read Only Memory (ROM) and temporarily stores programs and data necessary for executing the operation of the camera 10, and further information, data, or the like generated during operation. The RAM is, for example, a work memory used when the processor 12P is in operation. The ROM stores, for example, a program and data for controlling the processor 12P in advance. Further, the memory 13 stores, for example, identification information (for example, serial number) for identifying the camera 10 and various setting information.

The communication unit 14 sends the data of the captured image recorded in the recording unit 15 to the vehicle search server 50 and the video recorder 70 respectively via the network NW1 described above based on the instruction of the processor 12P. Further, the communication unit 14 receives the control command of the camera 10 sent from the outside (for example, the vehicle search server 50) and transmits the state information on the camera 10 to the outside (for example, the vehicle search server 50).

The recording unit 15 is constituted by using a semiconductor memory (for example, flash memory) incorporated in the camera 10 or an external storage medium such as a memory card (for example, an SD card) not incorporated in the camera 11. The recording unit 15 records the data of the captured image generated by the processor 12P in association with the identification information (an example of the camera information) of the camera 10 and the information on the imaging date and time. The recording unit 15 always pre-buffers and holds the data of the captured image for a predetermined time (for example, 30 seconds) and continuously accumulates the data while overwriting the data of the captured image up to a predetermined time (for example, 30 seconds) before the current time. When the recording unit 15 is constituted by a memory card, it is detachably mounted on the housing of the camera 10.

Figure 6:
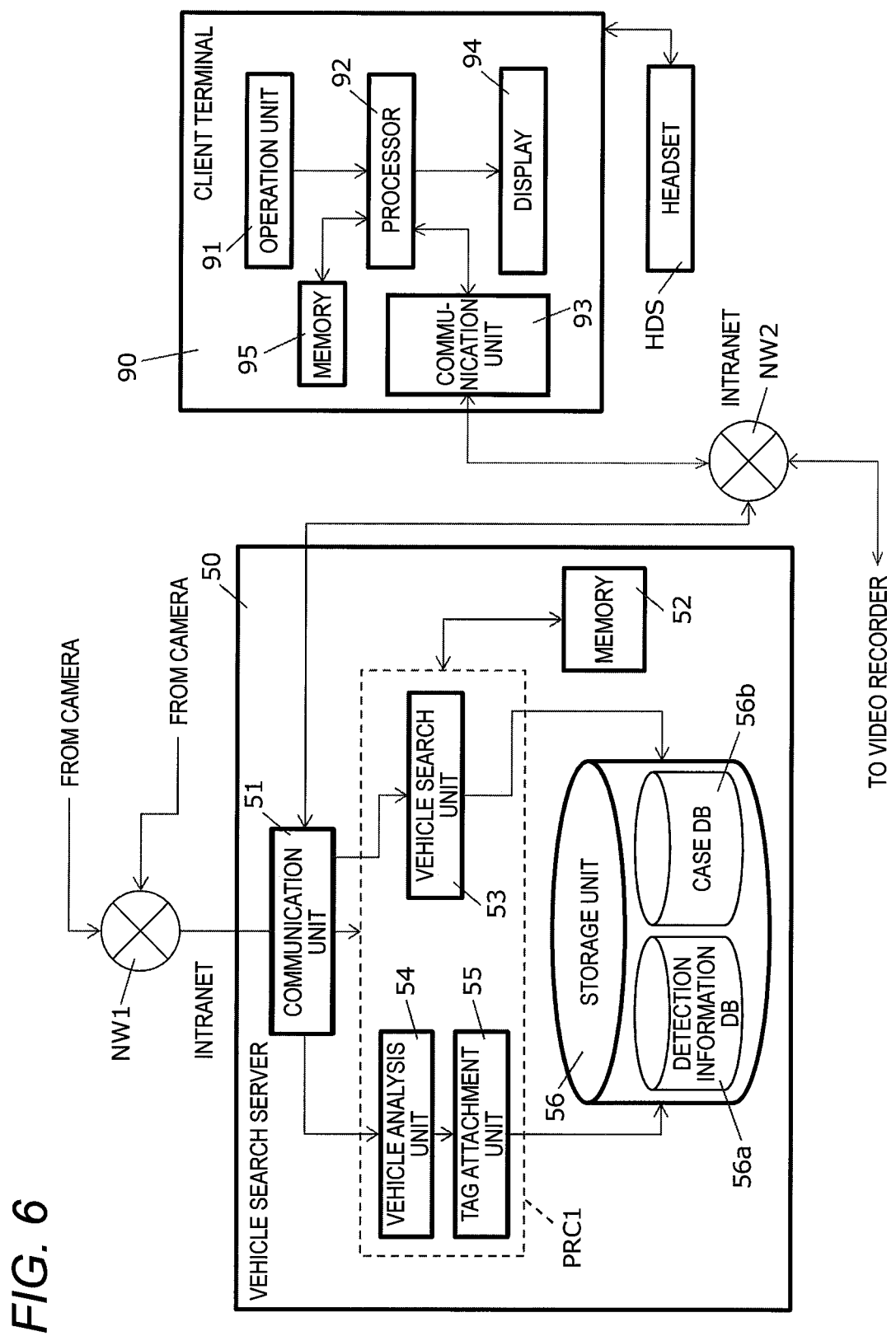
FIG. 6 is a block diagram illustrating an internal configuration example of each of a vehicle search server and a client terminal.

FIG. 6 is a block diagram illustrating an internal configuration example of each of the vehicle search server 50 and the client terminal 90. The vehicle search server 50, the client terminal 90, and the video recorder 70 are connected by using an intranet such as a wired Local Area Network (LAN) provided in the police station, but they may be connected via a wireless network such as a wireless LAN.

The vehicle search server 50 is constituted including a communication unit 51, a memory 52, a vehicle search unit 53, a vehicle analysis unit 54, a tag attachment unit 55, and the storage unit 56. The vehicle search unit 53, the vehicle analysis unit 54, and the tag attachment unit 55 are constituted by a processor PRC 1 such as a CPU, an MPU, a DSP, and an FPGA.

The communication unit 51 communicates with the cameras 10, 10a, . . . connected via the network NW1 such as an intranet and receives the data of captured images (that is, images showing the situation of intersections) sent respectively from the cameras 10, 10a, . . . . Further, the communication unit 51 communicates with the client terminal 90 via the network NW2 such as an intranet provided in the police station. The communication unit 51 receives the vehicle information request sent from the client terminal 90 or transmits a response to the vehicle information request. Further, the communication unit 51 sends the data of the captured image held in the memory 52 or the storage unit 56 to the video recorder 70.

The memory 52 is constituted using, for example, a RAM and a ROM and temporarily stores programs and data necessary for executing the operation of the vehicle search server 50, and further information or data generated during operation. The RAM is, for example, a work memory used when the processor PRC1 operates. The ROM stores, for example, a program and data for controlling the processor PRC1 in advance. Further, the memory 52 stores, for example, identification information (for example, serial number) for identifying the vehicle search server 50 and various setting information.

Based on the vehicle information request sent from the client terminal 90, the vehicle search unit 53 searches for vehicle information which matches the vehicle information request from the data stored in the storage unit 56. The vehicle search unit 53 extracts and acquires the search result of the vehicle information matching the vehicle information request. The vehicle search unit 53 sends the data of the search result (extraction result) to the client terminal 90 via the communication unit 51.

The vehicle analysis unit 54 sequentially analyzes the stored data of the captured images each time the data of the captured image from each of the cameras 10, 10a, . . . is stored in the storage unit 56 and extracts and acquires information (vehicle information) relating to a vehicle (in other words, the vehicle which has flowed in and out of the intersection where the camera is installed) appearing in the captured image. The vehicle analysis unit 54 acquires, as the vehicle information, information such as a car type, a car style, a car color, a license plate, and the like of a vehicle, information on a person who rides on the vehicle, the number of passengers, the travelling direction (specifically, the flow-in direction to the intersection and the flow-out direction from the intersection) of the vehicle when it passes through the intersection and sends it to the tag attachment unit 55. The vehicle analysis unit 54 is capable of determining the travelling direction when a vehicle passes through the intersection based on, for example, a temporal difference between frames of a plurality of captured images. The travelling direction indicates, for example, that the vehicle has passed through the intersection via any one of the travelling, straight advancing, left turning, right turning, or turning.

The tag attachment unit 55 associates (an example of tagging) the vehicle information obtained by the vehicle analysis unit 54 with the imaging date and time and the location (that is, the position of the intersection) of the captured image which are used for analysis by the vehicle analysis unit 54 and records them in a detection information DB (Database) 56a of the storage unit 56. Therefore, the vehicle search server 50 can clearly determine what kind of vehicle information is given to a captured image captured at a certain intersection at a certain time. The processing of the tag attachment unit 55 may be executed by the vehicle analysis unit 54, and in this case, the configuration of the tag attachment unit 55 is not necessary.

The storage unit 56 is constituted using, for example, a Hard Disk Drive (HDD) or a Solid State Drive (SSD). The storage unit 56 records the data of the captured images sent from the cameras 10, 10a, . . . in association with the identification information (in other words, the position information on the intersection where the corresponding camera is installed) of the camera which has captured the captured image and the information on the imaging date and time. The storage unit 56 also records information on road maps indicating the positions of intersections where the respective cameras 10, 10a, . . . are installed and records information on the updated road map each time the information on the road map is updated by, for example, new construction of a road, maintenance work, or the like. In addition, the storage unit 56 records intersection camera installation data indicating the correspondence between one camera installed at each intersection and the intersection. In the intersection camera installation data, for example, identification information on the intersection and identification information on the camera are associated with each other. Therefore, the storage unit 56 records the data of the captured image of the camera in association with the information on the imaging date and time, the camera information, and the intersection information. The information on the road map is recorded in a memory 95 of the client terminal 90.

The storage unit 56 also has the detection information DB 56a and a case DB 56b.

The detection information DB 56a stores the output (that is, a set of the vehicle information obtained as a result of analyzing the captured image of the camera by the vehicle analysis unit 54 and the information on the date and time and the location of the captured image used for the analysis) of the tag attachment unit 55. The detection information DB 56a is referred to when the vehicle search unit 53 extracts vehicle information matching the vehicle information request, for example.

The case DB 56b registers and stores witness information such as the date and time and the location when the case occurred and detailed case information such as vehicle information as a search result of the vehicle search unit 53b based on the witness information for each case such as an incident. The detailed case information includes, for example, case information such as the date and time and the location when the case occurred, a vehicle thumbnail image of the searched vehicle, the rank of a suspect candidate mark, surrounding map information including the point where the case occurred, the flow-in/flow-out direction of the vehicle with respect to the intersection, the intersection passing time of the vehicle, and the user's memo. Further, the detailed case information is not limited to the contents described above.

The client terminal 90 is constituted including an operation unit 91, a processor 92, a communication unit 93, the display 94, the memory 95, and a recording unit 96. The client terminal 90 is used by officials (that is, police officers who are users) in the police station. When there is a telephone call for notifying the occurrence of an incident or the like by a witness or the like of the incident, a user wears the headset HDS and answers the telephone. The headset HDS is used while being connected to the terminal 90, receives voice of a user, and outputs voice of a caller (that is, notifying person).

The operation unit 91 is a User Interface (UI) for detecting the operation of a user and is constituted using a mouse, a keyboard, or the like. The operation unit 91 outputs a signal based on the operation of a user to the processor 92. When, for example, it is desired to confirm the captured image of the intersection at the date and time and the location at which a case such as an incident investigated by a user occurred, the operation unit 91 accepts input of a search condition including the date and time, the location, and the features of a vehicle.

The processor 92 is constituted using, for example, a CPU, an MPU, a DSP, or an FPGA and functions as a control unit of the client terminal 90. The processor 92 performs control processing for totally supervising the operation of each part of the client terminal 90, input/output processing of data with each part of the client terminal 90, calculation processing of data, and storage processing of data. The processor 92 operates according to the programs and data stored in the memory 95. The processor 92 uses the memory 95 during operation. Further, the processor 92 acquires the current time information and displays the search result of a vehicle sent from the vehicle search server 50 or the captured image sent from the video recorder 70 on the display 94. In addition, the processor 92 creates a vehicle acquisition request including the search conditions (see above) input by the operation unit 91 and transmits the vehicle acquisition request to the vehicle search server 50 via the communication unit 93.

The communication unit 93 communicates with the vehicle search server 50 or the video recorder 70 connected via the network NW2 such as an intranet. For example, the communication unit 93 transmits the vehicle acquisition request created by the processor 92 to the vehicle search server 50 and receives the search result of the vehicle information sent from the vehicle search server 50. Also, the communication unit 93 transmits an acquisition request of captured images created by the processor 92 to the video recorder 70 and receives captured images sent from the video recorder 70.

The display 94 is constituted using a display device such as a Liquid Crystal Display (LCD), an organic Electroluminescence (EL) or the like, and displays various data sent from the processor 92.

The memory 95 is constituted using, for example, a RAM and a ROM and temporarily stores programs and data necessary for executing the operation of the client terminal 90, and further information or data generated during operation. The RAM is a work memory used during, for example, the operation of the processor 92. The ROM stores, for example, programs and data for controlling the processor 92 in advance. Further, the memory 95 stores, for example, identification information (for example, a serial number) for identifying the client terminal 90 and various setting information.

The recording unit 96 is constituted using, for example, a hard disk drive or a solid state drive. The recording unit 96 also records information on road maps indicating the positions of intersections where the respective cameras 10, 10a, . . . are installed and records information on the updated road map each time the information on the road map is updated by, for example, new construction of a road, maintenance work, or the like. In addition, the recording unit 96 records intersection camera installation data indicating the correspondence between one camera installed at each intersection and the intersection. In the intersection camera installation data, for example, identification information on the intersection and identification information on the camera are associated with each other. Accordingly, the recording unit 96 records the data of the image captured by the camera in association with the information on the imaging date and time, the camera information, and the intersection information.

Figure 7:
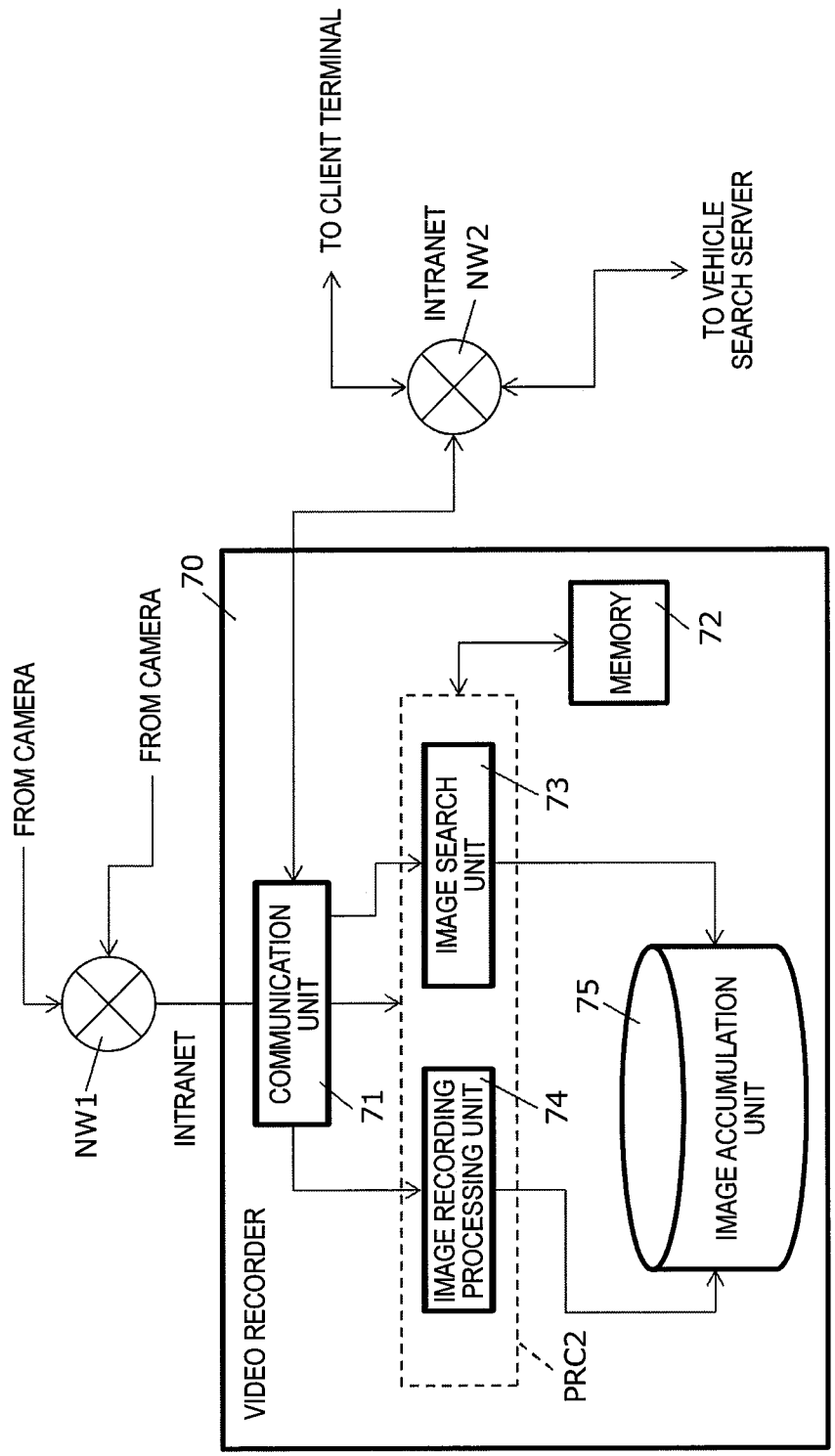
FIG. 7 is a block diagram illustrating an internal configuration example of a video recorder.

FIG. 7 is a block diagram illustrating an internal configuration example of the video recorder 70. The video recorder 70 is connected so as to be able to communicate with the cameras 10, 10a, . . . via the network NW1 such as an intranet and connected so as to be able to communicate with the vehicle search server 50 and the client terminal 90 via the network NW2 such as an intranet.

The video recorder 70 is constituted including a communication unit 71, a memory 72, an image search unit 73, an image recording processing unit 74, and an image accumulation unit 75. The image search unit 73 and the image recording processing unit 74 are constituted by a processor PRC2 such as a CPU, an MPU, a DSP, and an FPGA, for example.

The communication unit 71 communicates with the cameras 10, 10a, . . . connected via the network NW1 such as an intranet and receives the data of captured images (that is, images showing the situation of the intersection) sent from the cameras 10, 10a, . . . . Further, the communication unit 71 communicates with the client terminal 90 via the network NW2 such as an intranet provided in the police station. The communication unit 71 receives an image request sent from the client terminal 90 and transmits a response to the image request.

The memory 72 is constituted using, for example, a RAM and a ROM and temporarily stores programs and data necessary for executing the operation of the video recorder 70, and further information, data, or the like generated during operation. The RAM is, for example, a work memory used when the processor PRC2 is in operation. The ROM stores, for example, a program and data for controlling the processor PRC2 in advance. Further, the memory 72 stores, for example, identification information (for example, serial number) for identifying the video recorder 70 and various setting information.

Based on the image request sent from the client terminal 90, the image search unit 73 extracts the captured image of the camera matching the image request by searching the image accumulation unit 75. The image search unit 73 sends the extracted data of the captured image to the client terminal 90 via the communication unit 71.

Each time the data of the captured images from each of the cameras 10, 10a, . . . is received by the communication unit 71, the image recording processing unit 74 records the received data of the captured images in the image accumulation unit 75.

The image accumulation unit 75 is constituted using, for example, a hard disk or a solid state drive. The image accumulation unit 75 records the data of the captured images sent from each of the cameras 10, 10a, . . . in association with the identification information (in other words, the position information on the intersection where the corresponding camera is installed) of the camera which has captured the captured image and the information on the imaging date and time.

Next, various screens displayed on the display 94 of the client terminal 90 at the time of investigation by a police officer who is a user of the first embodiment will be described with reference to FIGS. 6 to 19. In the description of FIGS. 6 to 19, the same reference numerals and characters are used for the same components as those illustrated in the drawings and the description thereof is simplified or omitted.

In the investigation, the client terminal 90 executes and activates a preinstalled vehicle detection application (hereinafter, referred to as "vehicle detection application") by the operation of a user (police officer). The vehicle detection application is stored in the ROM of the memory 95 of the client terminal 90, for example, and executed by the processor 92 when it is activated by the operation of a user. Various data or information created by the processor 92 during the activation of the vehicle detection application is temporarily held in the RAM of the memory 95.

Figure 8:
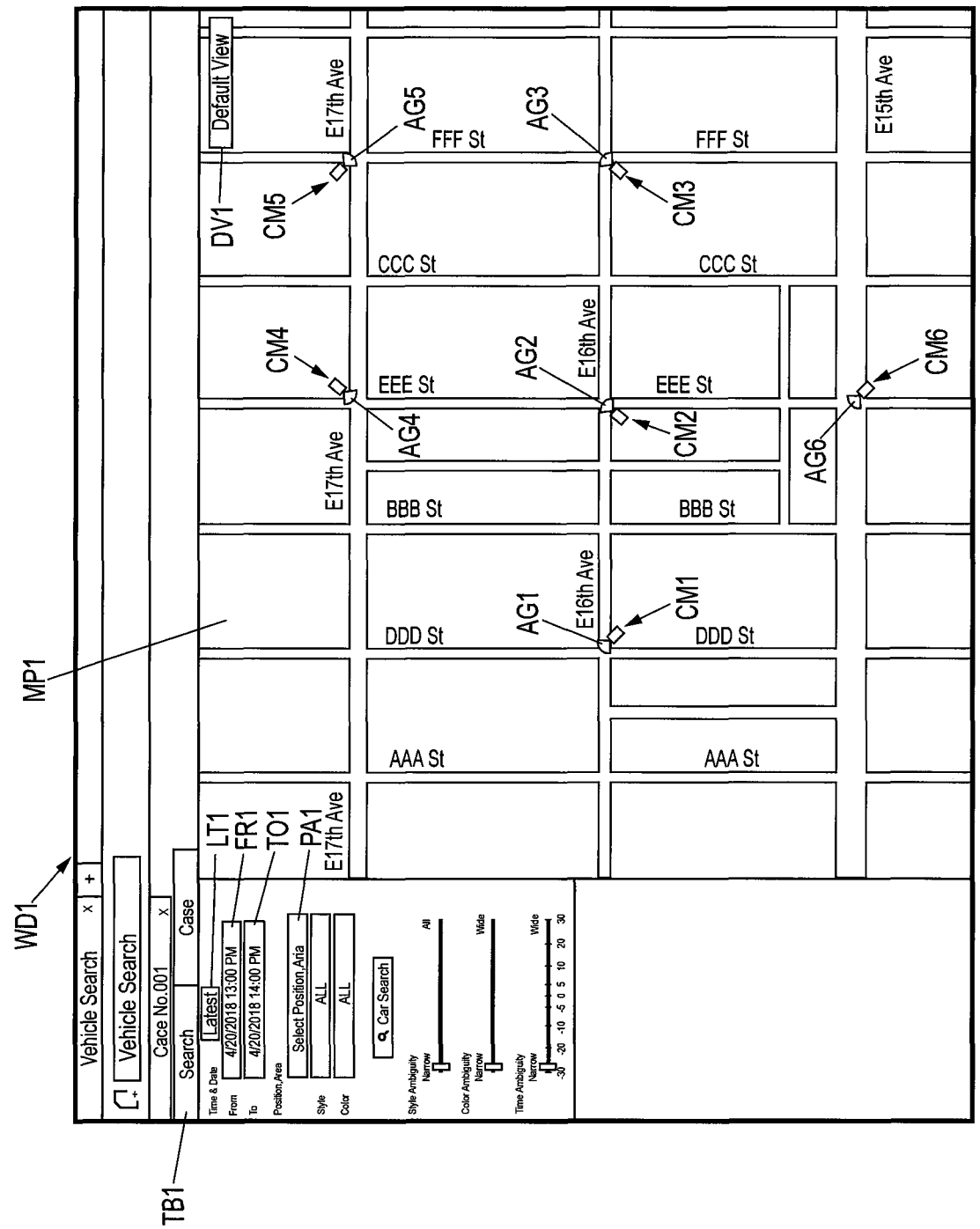
FIG. 8 is a diagram illustrating an example of a vehicle search screen.
Figure 9:
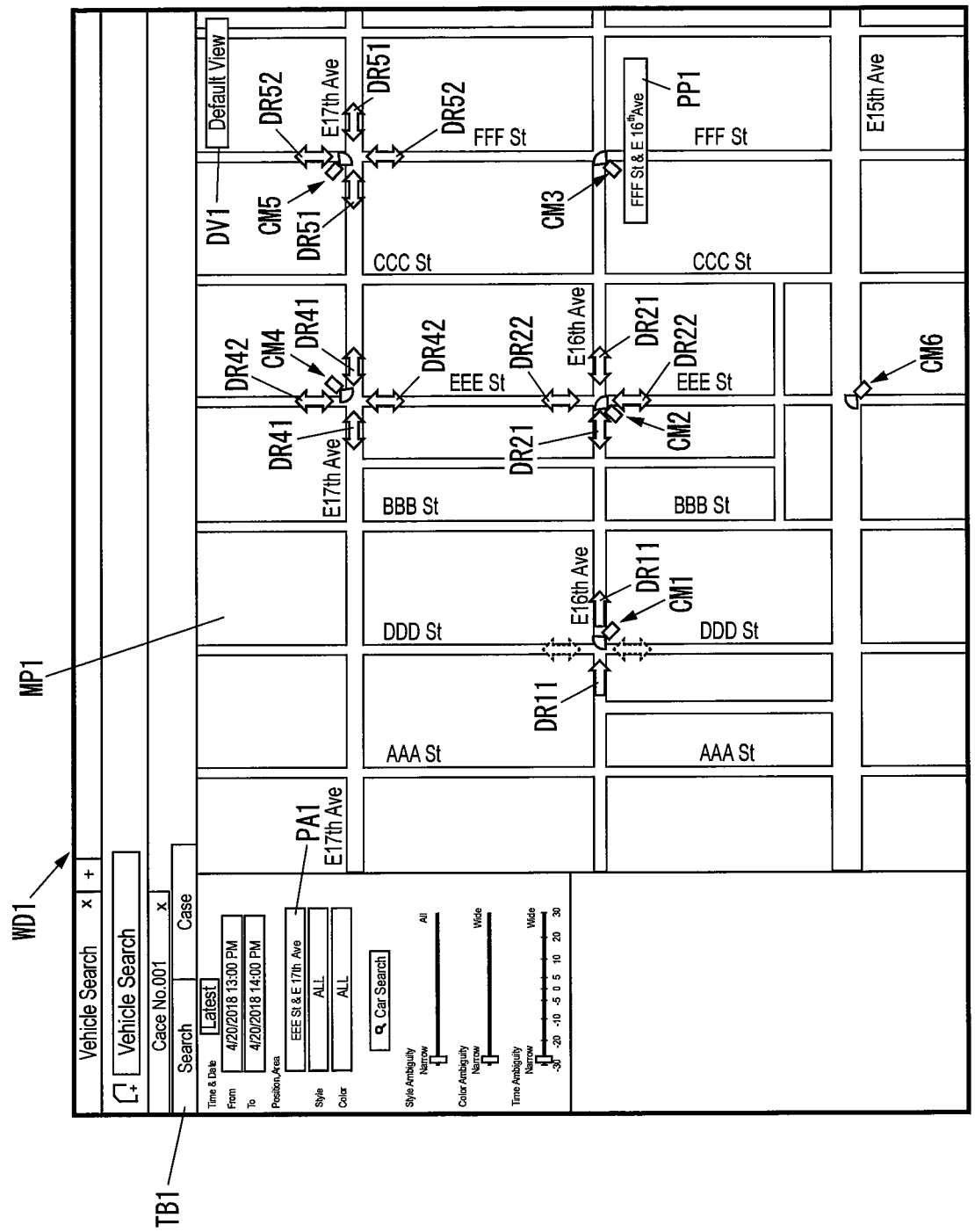
FIG. 9 is an explanatory view illustrating a setting example of flow-in and flow-out directions of a vehicle with respect to an intersection.
Figure 10:
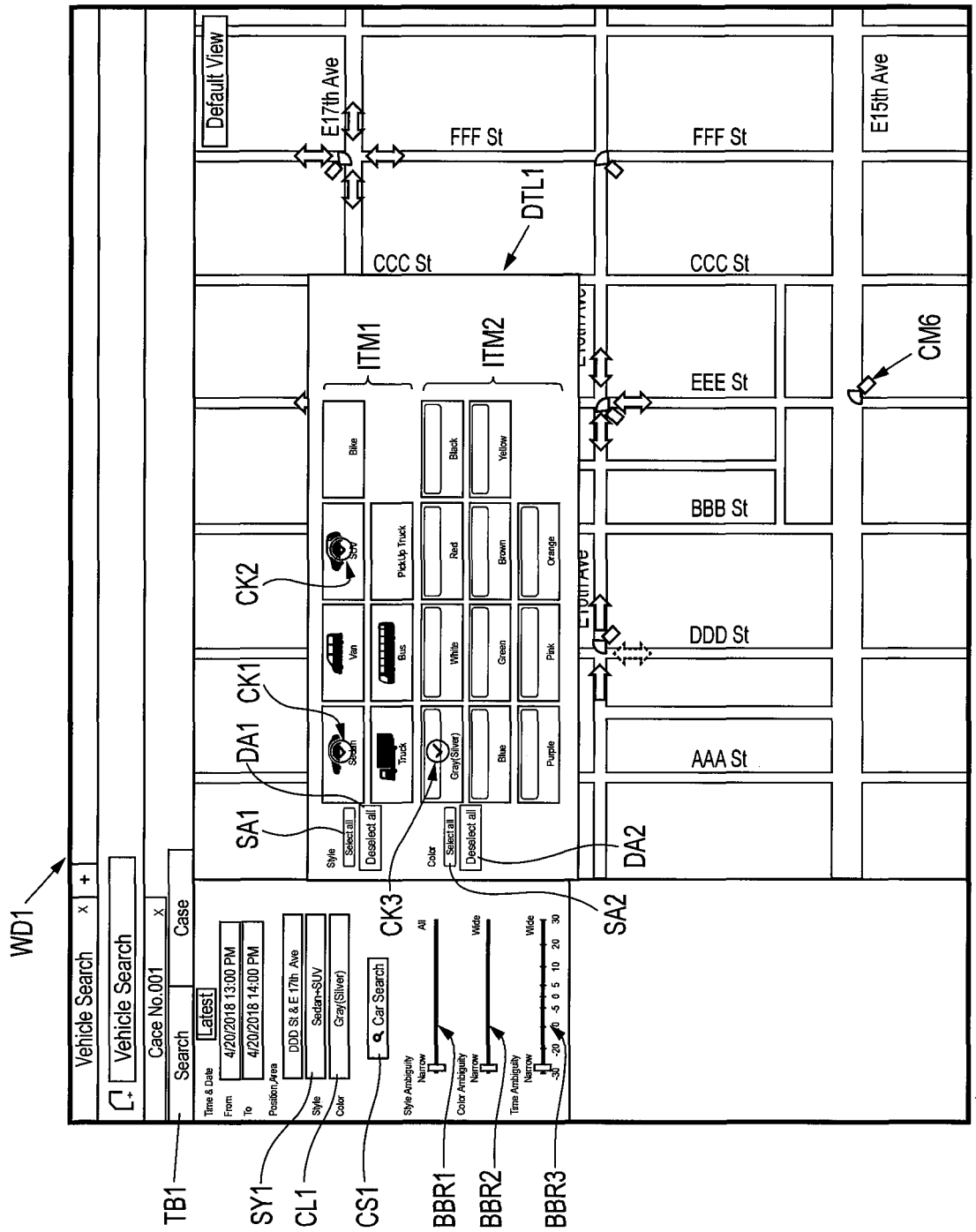
FIG. 10 is an explanatory view illustrating a setting example of a car style and a car color of a vehicle.

FIG. 8 is a diagram illustrating an example of a vehicle search screen WD1. FIG. 9 is an explanatory view illustrating a setting example of a flow-in/flow-out direction of a getaway vehicle with respect to an intersection. FIG. 10 is an explanatory view illustrating a setting example of the car style and the car color of the getaway vehicle. The processor 92 displays the vehicle search screen WD1 on the display 94 by a predetermined user operation in the vehicle detection application. The vehicle search screen WD1 is constituted such that both a road map MP1 corresponding to the information of the road map recorded in the recording unit 96 of the client terminal 90 and input fields of a plurality of search conditions specified by a search tab TB1 are displayed side by side. In the following description, the vehicle detection application is executed by the processor 92 and communicates with the vehicle search server 50 or the video recorder 70 during its execution.

Icons of cameras CM1, CM2, CM3, CM4, CM5 and CM6 are arranged on the road map MP1 so as to indicate the positions of intersection at which the respective corresponding cameras are installed. Even when one or more cameras are installed at a corresponding intersection, one camera icon is representatively shown. When vehicle information is searched by the vehicle search server 50, captured images of one or more cameras installed at an intersection in a place designated by a user are to be searched. As a result, a user can visually determine the location of the intersection at which the camera is installed. The internal configurations of the cameras CM1 to CM6 are the same as those of the cameras 10, 10a, . . . illustrated in FIG. 2. As described above, when the camera is installed at the intersection, only one camera is installed. Further, as described with reference to FIGS. 3 to 5, each of the cameras CM1 to CM6 can capture images with a plurality of imaging view angles using a plurality of imaging portions.

For example, in FIG. 8, the icon of the camera CM1 is arranged such that an imaging view angle AG1 (that is, northwest direction) becomes the center. In addition, the icon of the camera CM2 is arranged such that an imaging view angle AG2 (that is, northeast direction) becomes the center. The icon of the camera CM3 is arranged such that an imaging view angle AG3 (that is, northeast direction) becomes the center. The icon of the camera CM4 is arranged such that an imaging view angle AG4 (that is, southwest direction) becomes the center. The icon of the camera CM5 is arranged such that an imaging view angle AG5 (that is, southeast direction) becomes the center. Also, the icon of the camera CM6 is arranged such that an imaging view angle AG6 (that is, northwest direction) becomes the center.

Input fields of a plurality of search conditions specified by the search tab TB1 include, for example, a "Latest" icon LT1, a date and time start input field FR1, a date and time end input field TO1, a position area input field PA1, a car style input field SY1, a car color input field CL1, a search icon CS1, a car style ambiguity search bar BBR1, a car color ambiguity search bar BBR2, and a time ambiguity search bar BBR3.

The "Latest" icon LT1 is an icon for setting the search date and time to the latest date and time. When the "Latest" icon LT1 is pressed by a user's operation during investigation, the processor 92 sets the latest date and time (for example, a 10 minute-period before the date and time at the time of being pressed) as a search condition (for example, a period).

During investigation, in order for the vehicle search server 50 to search a vehicle (hereinafter, referred to as an "getaway vehicle") on which a person such as a suspect who caused an incident or the like rides, the date and time start input field FR1 is input by a user's operation as the date and time to be a start (origin) of the existence of the getaway vehicle which is a target of the search. In the date and time start input field FR1, for example, the occurrence date and time of an incident or the like or the date and time slightly before the occurrence date and time are input. In FIGS. 8 to 10, an example in which "1:00 p.m. (13:00 p.m.) on Apr. 20, 2018" is input to the date and time start input field FR1 is illustrated. When the date and time are input by a user's operation, the processor 92 sets the date and time input to the date and time start input field FR1 as a search condition (for example, start date and time).

During the investigation, to make the vehicle search server 50 search for the getaway vehicle, the date and time end input field TO1 is input by a user's operation as the date and time at which the existence of the getaway vehicle which is the target of the search is terminated. The end date and time of a search period of the getaway vehicle is input to the date and time end input field TO1. In FIGS. 8 to 10, an example in which "2:00 p.m. (14:00) on Apr. 20, 2018" is input to the date and time end input field TO1 is illustrated. When the date and time are input by a user's operation, the processor 92 sets the date and time input to the date and time end input field TO1 as a search condition (for example, end date and time).

When the processor 92 detects pressing of the date and time start input field FR1 or the date and time end input field TO1 by a user's operation, the processor 92 displays a detailed pane screen (not illustrated) including a calendar (not illustrated) which correspond to each of the date and time start input field FR1 and the date and time end input field TO1 and a pull down list for selecting the time for starting or ending. Further, when the processor 92 detects pressing (clicking) of a predetermined icon (not illustrated) by a user's operation, the processor 92 may display a detailed pane screen (not illustrated) including a calendar (not illustrated) which correspond to each of the date and time start input field FR1 and the date and time end input field TO1 and a pull-down list for selecting the time for starting or ending. As a result, a user is prompted to select the date and time by the client terminal 90. When the date information on which the data of the captured image of the camera is recorded is acquired from the vehicle search server 50, the processor 92 may selectably display only the date corresponding to the date information. The processor 92 can accept other operations only when it is detected that the detailed pane screen (not illustrated) is closed by a user's operation.

Figure 11:
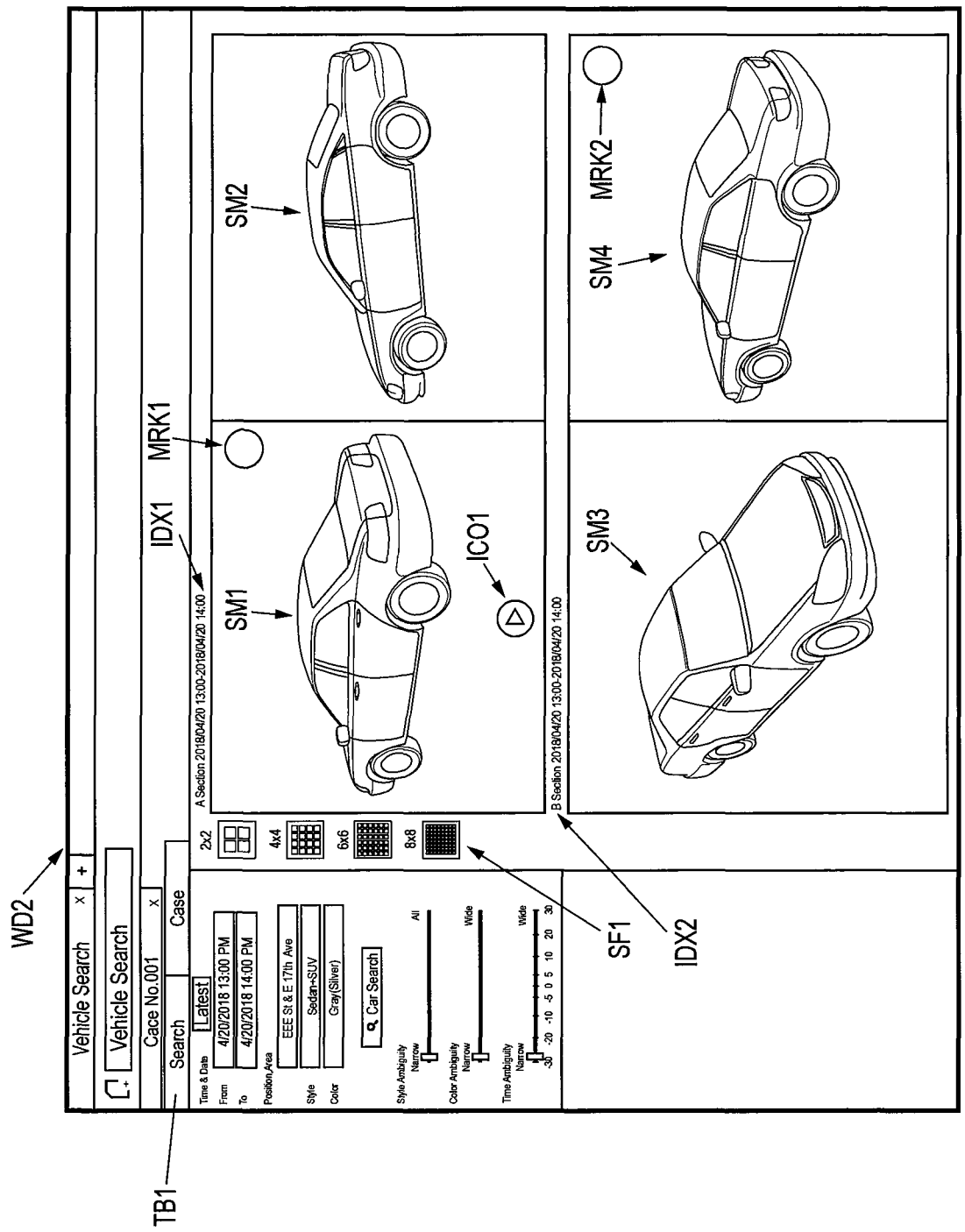
FIG. 11 is a diagram illustrating an example of a search result screen of a vehicle candidate.

During the investigation, to make the vehicle search server 50 search for the getaway vehicle, the position area input field PA1 is input by a user's operation as a position (in other words, the intersection where the camera is installed) where the getaway vehicle which is the target of the search passed. When, for example, the icon of the camera indicated on the road map MP1 is designated by a user's operation, it is displayed in the position area input field PA1. In FIGS. 9 to 11, an example in which "EEE St. & E17th Ave" is input to the position area input field PA1 is illustrated. When a location is input by a user's operation, the processor 92 sets the location (that is, position information of the location) input to the position area input field PA1 as a search condition (for example, a location). The processor 92 can accept up to four inputs in the position area input field PA1 and the processor 92 may display a pop-up error message when, for example, an input exceeding four points is accepted.

As illustrated in FIG. 9, the processor 92 can set at least one of the flow-in direction and the flow-out direction of the getaway vehicle to the intersection as a search condition by a predetermined operation on the icon of the camera designated by a user's operation. In FIG. 9, an arrow of a solid line indicates that selection is in progress and an arrow of a broken line indicates a non-selection state. For example, at the intersection of the camera CM1, a direction DR11 indicating one direction from the west to the east is set as a flow-in direction and a flow-out direction. At the intersection of the camera CM2, a direction DR21 indicating bi-direction from the west to the east and from the east to the west and a direction DR22 indicating bi-direction from the south to the north and from the north to the south are respectively set as the flow-in direction and the flow-out direction. At the intersection of the camera CM4, a direction DR41 indicating bi-direction from the west to the east and from the east to the west and a direction DR42 indicating bi-direction from the south to the north and from the north to the south are respectively set as the flow-in direction and the flow-out direction. At the intersection of the camera CM5, a direction DR51 indicating bi-direction from the west to the east and from the east to the west and a direction DR52 indicating bi-direction from the south to the north and from the north to the south are respectively set as the flow-in direction and the flow-out direction.

As illustrated in FIG. 9, when the mouse over on the icon of the camera (for example, camera CM3) by a user's operation is detected, the processor 92 may display the place name of the intersection corresponding to the camera CM3 by a pop-up display PP1.

Also, the road map MP1 in the vehicle search screen WD1 is appropriately slid by a user's operation and displayed by the processor 92. Here, when a default view icon DV1 is pressed by a user's operation, the processor 92 switches the display of the current road map MP1 to the road map MP1 of a predetermined initial state and displays it.

When pressing of the car style input field SY1 or the car color input field CL1 by a user's operation is detected, the processor 92 displays a vehicle style and car color selection screen DTL1 of the getaway vehicle in a state where the vehicle style and car color selection screen DTL1 is superimposed on the road map MP1 of the vehicle search screen WD1.

During the investigation, to make the vehicle search server 50 search for the getaway vehicle, the car style input field SY1 is input as a car style (that is, the shape of the body of the getaway vehicle) of the getaway vehicle which is a target of the search by a user's operation from a plurality of selection items ITM1. Specifically, the selection items ITM1 of the car style include a sedan, a wagon (Van), a sport utility vehicle (SUV), a bike, a truck, a bus, and a pickup truck. At least one of them is selected by a user's operation and input. In FIG. 10, for example, selection icons CK1 and CK2 indicating that a sedan and a sport utility vehicle are selected are illustrated. When all of them are selected, an all selection icon SA1 is pressed by a user's operation. When all the selections are canceled, an all cancel icon DA1 is pressed by a user's operation.

During the investigation, to make the vehicle search server 50 search for the getaway vehicle, the car color input field CL1 is input by a user's operation as the car color (that is, the color of the body of the getaway vehicle) of the getaway vehicle which is a target of the search. Specifically, selection items ITM2 of the car color include gray/silver, white, red, black, blue, green, brown, yellow, purple, pink, and orange. At least one of them is selected and input by a user's operation. In FIG. 10, for example, a selection icon CK3 indicating that gray/silver is selected is illustrated. When all of them are selected, an all selection icon SA2 is pressed by a user's operation. When all the selections are canceled, an all cancel icon DA2 is pressed by a user's operation.

The search icon CS1 is displayed by the processor 92 so that it can be pressed when all the various search conditions input by the user's operation are properly input. When the search icon CS1 is pressed by a user's operation, the processor 92 detects the pressing, generates a vehicle information request including various input search conditions, and sends it to the vehicle search server 50 via the communication unit 93. The processor 92 receives and acquires the search result of the vehicle search server 50 based on the vehicle information request via the communication unit 93.

The car style ambiguity search bar BBR1 is a slide bar which can adjust the car-style search accuracy between the search with narrow accuracy and the search with accuracy including all car styles by a user's operation. When it is adjusted to the narrow side, the processor 92 sets the same car style as that of the car style input field SY1 as the search condition (for example, car style). On the other hand, when it is adjusted to the all side, the processor 92 sets the search condition (for example, car style) including all vehicle styles of the selection items ITM1, not limited to the car style input to the car style input field SY1.

The car color ambiguity search bar BBR2 is a slide bar which can adjust the car-color search accuracy between the search with narrow accuracy and the search with wide accuracy by a user's operation. When it is adjusted to the narrow side, the processor 92 sets the same car color as that of the car color input field CL1 as the search condition (for example, car color). On the other hands, when it is adjusted to the wide side, the processor 92 sets the search condition (for example, car color) broadly including car colors close to or similar to the car color input to the car color input field CL1.

The time ambiguity search bar BBR3 is a slide bar which can adjust the time within the range of, for example, 30 minutes ahead or behind (that is, −30, −20, −10, −5, 0, +5, +10, +20, +30 minutes), as the search accuracy of the start time and the end time of the date and time by a user's operation. When the bars are separately slid to any position between the −30 minute side and the +30 minute side by a user's operation with respect to each of a date and time start input field FR1 and the date and time end input field TO1 to which input is made, the processor 92 sets the search condition (for example, date and time) in a state where the date and time are adjusted according to the position of the adjustment bar of the time ambiguity search bar BBR3 from the respective times inputted to the date and time start input field FR1 and the date and time end input field TO1.

FIG. 11 is a diagram illustrating an example of a search result screen WD2 of a vehicle candidate.

In the vehicle detection application, when the data of a vehicle search result is acquired from the vehicle search server 50 by s user's operation of pressing the search icon CS1 in the vehicle search screen WD1, the process 92 displays the search result screen WD2 of the vehicle candidates (that is, getaway vehicle candidates) on the display 94. The search result screen WD2 has a configuration in which both the input fields of a plurality of search conditions specified by the search tab TB1 and the lists of a search result of vehicle candidates searched by the vehicle search server 50 are displayed side by side.

In FIG. 11, based on the vehicle information request including the search conditions described with reference to FIGS. 8 to 10, the search result made by the vehicle search server 50 is illustrated as a list with indices IDX1 and IDX2 including the date and time and the location of the search conditions. Specifically, the search result screen WD2 is displayed on the display 94 of the client terminal 90. In FIG. 11, for example, vehicle thumbnail images SM1, SM2, SM3, and SM4 of four (=2*2, *: multiplier operator) vehicle candidates (that is, candidates of the getaway vehicle) are displayed in one screen. When any display number change icon SF1 is pressed by a user's operation, the processor 92 displays the vehicle thumbnail images corresponding to the search result in a state where the display number of vehicle thumbnail images is changed to the display number corresponding to the pressed display number change icon SF1. The display number change icon SF1 is illustrated as being selectable from 2*2, 4*4, 6*6, and 8*8, for example.

The indices IDX1 and IDX2 are used, for example, to display search results (vehicle thumbnail images) by dividing the search results at every location and at every predetermined time (for example, 10 minutes). Therefore, vehicles in the vehicle thumbnail images SM1 and SM2 corresponding to the index IDX1 are vehicles which are searched at the same location (for example, A section) and in the same time period from the start date and time to the end date and time of the search condition. Similarly, vehicles in the vehicle thumbnail images SM3 and SM4 corresponding to the index IDX2 are vehicles which are searched at the same location (for example, B section) and in the same time period from the start date and time to the end date and time of the search condition.

Further, when a user who viewed the vehicle thumbnail images displayed on the search result screen WD2 considers that the vehicle in the image is a suspect vehicle having the possibility of the getaway vehicle, the processor 92 displays suspect candidate marks MRK1 and MRK2 near the corresponding vehicle thumbnail images by a user's operation. In this case, the processor 92 temporarily holds information indicating that the suspect candidate mark is assigned in association with the selected vehicle thumbnail image. In the example of FIG. 11, it is indicated that suspect candidate marks MRK1 and MRK2 are respectively given to the two vehicles in the vehicle thumbnail images SM1 and SM4.

As illustrated in FIG. 11, when the mouse over in the vehicle thumbnail image (for example, vehicle thumbnail image SM1) by a user's operation is detected, the processor 92 displays a reproduction icon ICO1 of the captured image in which the vehicle corresponding to the vehicle thumbnail image SM1 is captured.

Figure 12:
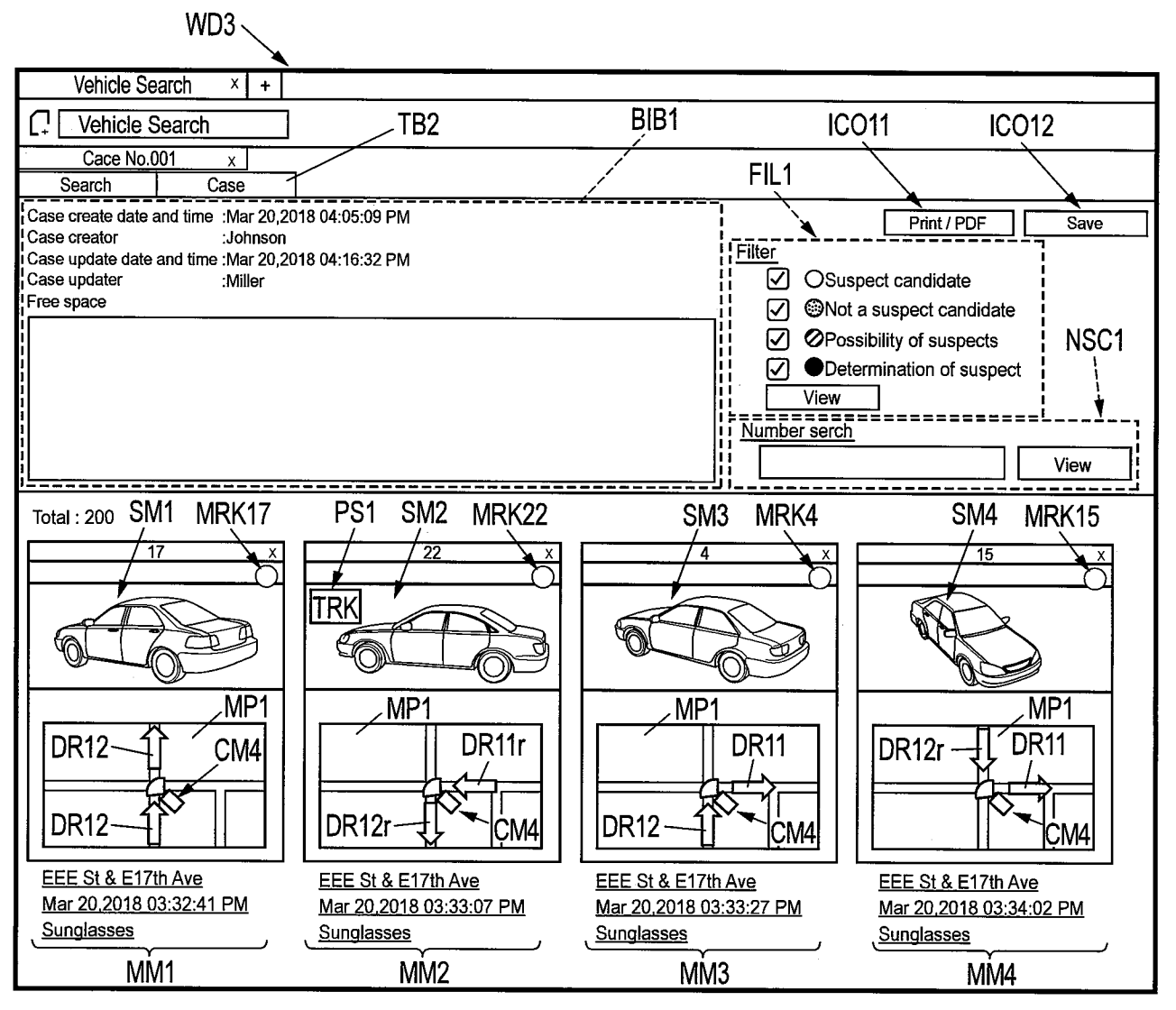

FIG. 12 is a diagram illustrating an example of a case screen WD3. The case screen WD3 has a configuration in which both various bibliographic information BIB1 related to a specific case and data (hereinafter, referred to as "case data") including a vehicle search result by the vehicle search server 50 corresponding to the case are displayed side by side. In the case screen WD3, for example, when any one of the case data is read from the case DB56*b* in the vehicle search server 50 by an instruction from the client terminal 90 to the vehicle search server 50 when the case tab TB2 is pressed by the user operation, the case data is sent from the vehicle search server 50 to the client terminal 90 and then displayed by the processor 92 in the client terminal 90. In the case screen WD3, the bibliographic information BIB1 includes the case occurrence date and time (Case create date and time), the Case creator, the Case update date and time, the Case updater, and the Free space.

The case create date and time indicates, for example, the date and time when the case data including a vehicle search result and the like using the search condition of the vehicle search screen WD1 is created and, in the example of FIG. 12, "Mar. 20, 2018, 04:05:09 PM" is illustrated. The case creator indicates, for example, the name of a police officer who is a user who created the case data and, in the example of FIG. 12, "Johnson" is illustrated.

The Case update date and time indicates, for example, the date and time when the case data once created is updated and "Mar. 20, 2018, 04:16:32 PM" is illustrated in the example of FIG. 12.

The Case updater indicates, for example, the name of a police officer who is a user who updated the content of the case data once created and "Miller" is illustrated in the example of FIG. 12.

In the case screen WD3, a vehicle search result list by the vehicle search server 50 corresponding to a specific case is illustrated with the bibliographic information BIB1 described above. In the example of FIG. 12, the search results of a total of 200 vehicles are obtained and vehicle thumbnail images SM1, SM2, SM3, and SM4 (see FIG. 11) of the first four vehicles are exemplarily illustrated. When there are five or more search results, the processor 92 scrolls and displays the screen according to a user's scroll operation as appropriate. To indicate that there is a possibility that a person such as a suspect may ride on the vehicle, suspect candidate marks MRK17, MRK22, MRK4, and MRK15 with a yellow rank (see below) are respectively given to the vehicles corresponding to the vehicle thumbnail images SM1, SM2, SM3, and SM4 illustrated in FIG. 12 by a user's operation.

In the example of FIG. 12, the vehicle thumbnail image SM1 and the passing directions (specifically, the direction DR12 indicating the flow-in direction and the direction DR12 indicating the flow-out direction) when the vehicle corresponding to the vehicle thumbnail image SM1 passes through the intersection on "EEE St. & E17th Ave" on which the camera CM4 is arranged on the road map MP1 are displayed in association with each other. Further, the location (for example, an intersection on "EEE ST. & E17th Ave") at which the vehicle corresponding to the vehicle thumbnail image SM1 is detected by analysis of the captured image of the camera CM4, the date and time (for example, "Mar. 20, 2018 03:32:41 PM"), and a memo (for example, "sunglasses") of the creator or updater are displayed as a memorandum MM1. Data input to the memo field can be made by a user's operation to show the features of a suspect and the like.

Similarly, the vehicle thumbnail image SM2 and the passing directions (specifically, the direction DR11*r* indicating the flow-in direction and the direction DR12*r* indicating the flow-out direction) when the vehicle corresponding to the vehicle thumbnail image SM2 passes through the intersection on "EEE ST. & E17th Ave" on which the camera CM4 is arranged on the road map MP1 are displayed in association with each other. Further, the location (for example, an intersection on "EEE ST. & E17th Ave") at which the vehicle corresponding to the vehicle thumbnail image SM2 is detected by analysis of the captured image of the camera CM4, the date and time (for example, "Mar. 20, 2018 03:33:07 PM"), and a memo (for example, "sunglasses") of the creator or updater are displayed as a memorandum MM2.

Similarly, the vehicle thumbnail image SM3 and the passing directions (specifically, the direction DR12 indicating the flow-in direction and the direction DR11 indicating the flow-out direction) when the vehicle corresponding to the vehicle thumbnail image SM3 passes through the intersection on "EEE ST. & E17th Ave" on which the camera CM4 is arranged on the road map MP1 are displayed in association with each other. Further, the location (for example, an intersection on "EEE ST. & E17th Ave") at which the vehicle corresponding to the vehicle thumbnail image SM3 is detected by analysis of the captured image of the camera CM4, the date and time (for example, "Mar. 20, 2018 03:33:27 PM"), and a memo (for example, "sunglasses") of the creator or updater are displayed as a memorandum MM3.

Similarly, the vehicle thumbnail image SM4 and the passing directions (specifically, the direction DR12*r* indicating the flow-in direction and the direction DR11 indicating the flow-out direction) when the vehicle corresponding to the vehicle thumbnail image SM4 passes through the intersection on "EEE ST. & E17th Ave" on which the camera CM4 is arranged on the road map MP1 are displayed in association with each other. Further, the location (for example, an intersection on "EEE ST. & E17th Ave") at which the vehicle corresponding to the vehicle thumbnail image SM4 is detected by analysis of the captured image of the camera CM4, the date and time (for example, "Mar. 20, 2018 03:34:02 PM"), and a memo (for example, "sunglasses") of the creator or updater are displayed as a memorandum MM4.

In addition, the processor 92 can display a "Print/PDF" icon ICO11 and a "Save" icon ICO12 on the case screen WD3. When the "Print/PDF" icon ICO11 is pressed, the processor 92 is instructed to send the case data corresponding to the current case tab TB2 to a printer (not illustrated) connected to the client terminal 90 and print out it or to create a case report (see below). When the "Save" icon ICO12 is pressed, the processor 92 is instructed to store the case data corresponding to the current case tab TB2 in the vehicle search server 50.

When it is detected that at least one of the ranks (for example, yellow, white, red, and black) of the suspect candidate marks is selected by a user's operation and a View icon in FIG. 12 is pressed, the processor 92 can filter out (select) and extract the vehicle thumbnail image to which the corresponding suspect candidate marker is given from the current case data. In FIG. 12, a filtering operation display area FIL1 including a check box of the suspect candidate marker and the View icon is displayed for filtering based on the rank of the suspect candidate marker.

As illustrated in FIG. 12, when it is detected that an individual identification number (for example, the identification number given to the display window of the vehicle thumbnail image) is input and the View icon is pressed, the processor 92 can filter out (select) and extract the corresponding vehicle thumbnail image from the current case data. In FIG. 12, a filtering operation display area NSC1 including an identification number input field and the View icon is displayed for filtering based on the individual identification number.

In the vehicle candidate search result screen WD2 illustrated in FIG. 11, instead of the vehicle thumbnail images SM1 to SM4 of vehicles searched (extracted) by the vehicle search server 50, the screen (see FIG. 12) in which the vehicle thumbnail images SM1 to SM4 of the vehicles searched (extracted) by the vehicle search server 50 and the road map MP1 indicating the passing direction of each vehicle at the time of passing through the intersection (for example, the intersection where the camera CM4 is installed) are associated with each other may be displayed.

Figure 13:
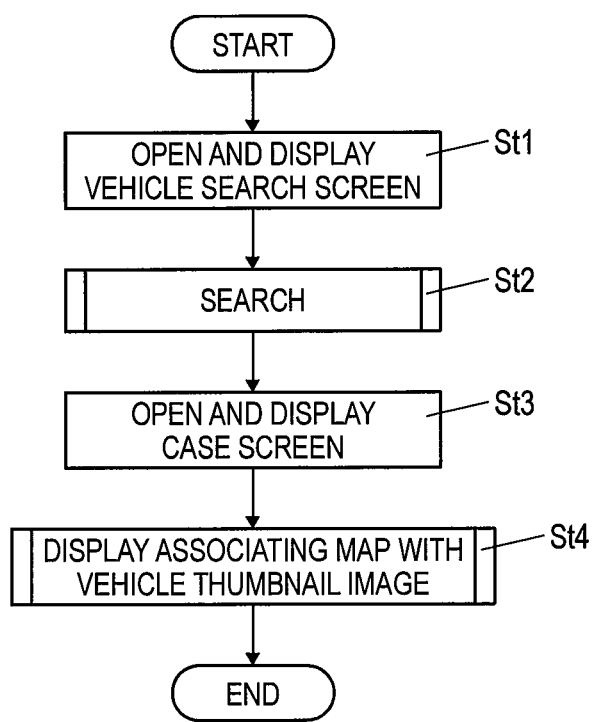
FIG. 13 is a flowchart illustrating an example of an operation procedure of an associative display of a vehicle thumbnail image and a map.
Figure 14:
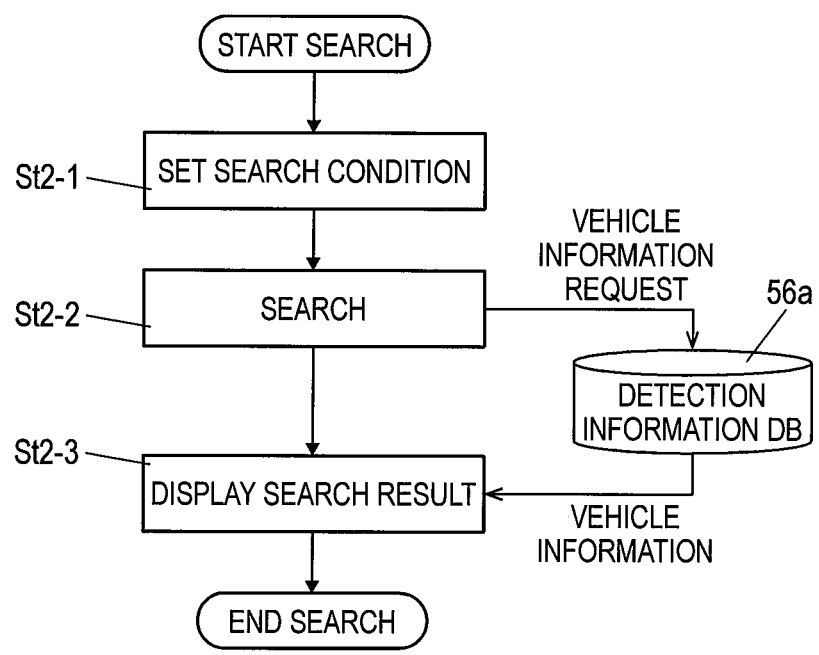
FIG. 14 is a flowchart illustrating an example of a detailed operation procedure of Step St2 in FIG. 13.
Figure 15:
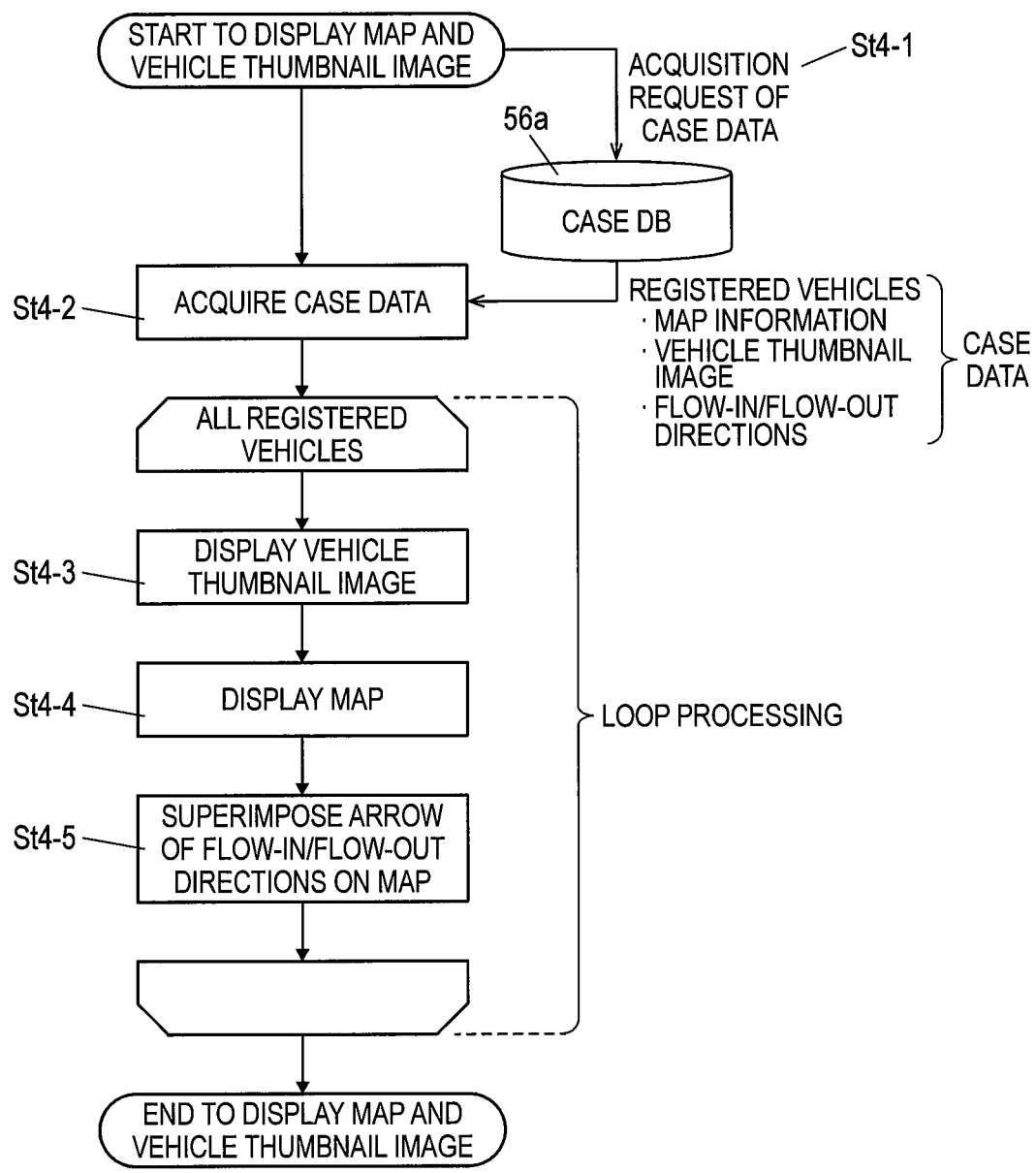
FIG. 15 is a flowchart illustrating an example of a detailed operation procedure of Step St4 in FIG. 13.
Figure 16:
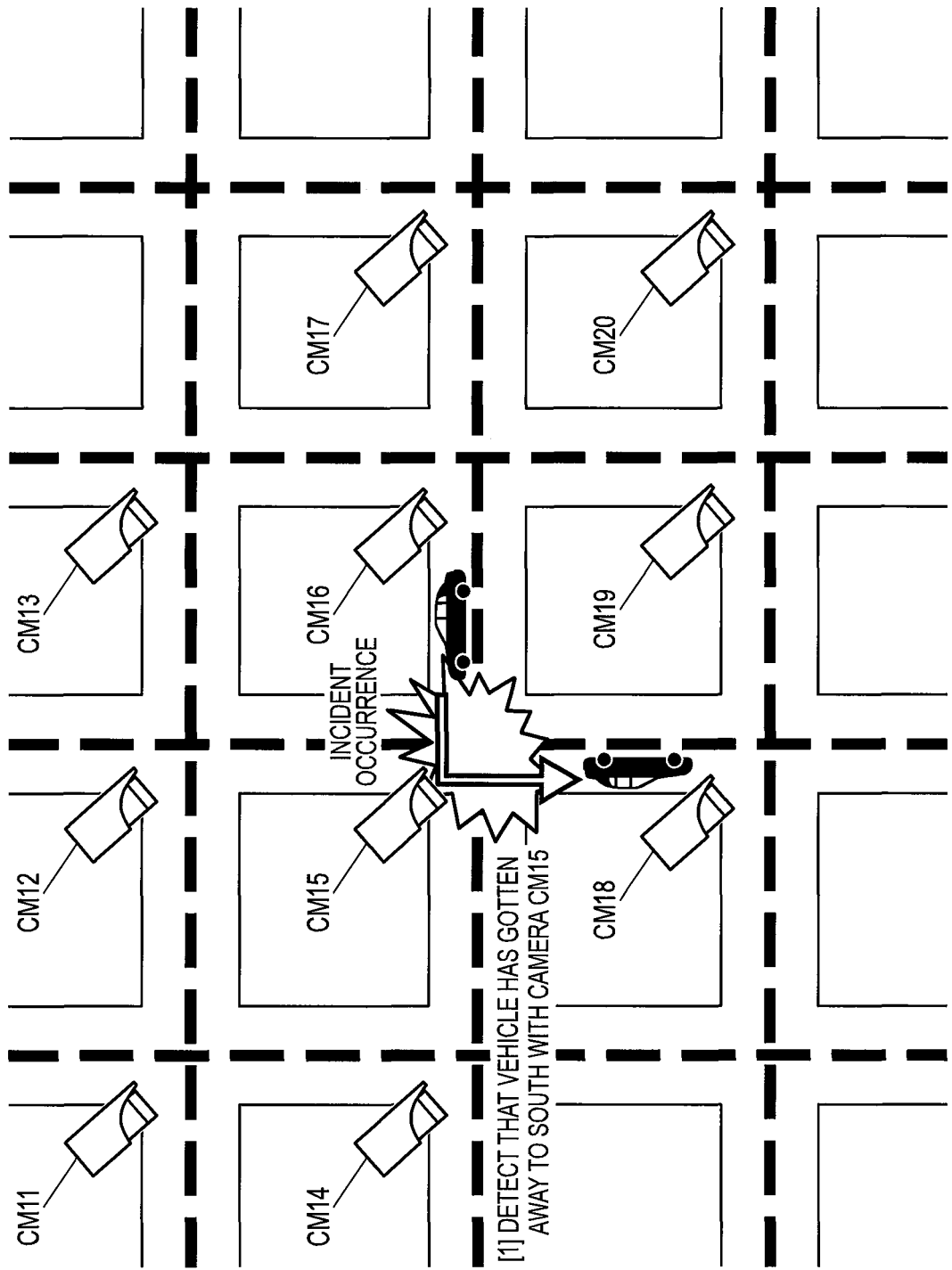

Next, the operation procedure of the vehicle detection system 100 according to the first embodiment will be described with reference to FIGS. 13 to 15. In FIGS. 13 to 15, the explanation is mainly focused on the operation of the client terminal 90 and the operation of the vehicle search server 50 is complementarily explained as necessary.

FIG. 13 is a flowchart illustrating an example of an operation procedure of an associative display of the vehicle thumbnail image and the map. FIG. 14 is a flowchart illustrating an example of a detailed operation procedure of Step St2 in FIG. 13. FIG. 15 is a flowchart illustrating an example of a detailed operation procedure of Step St4 in FIG. 13.

In FIG. 13, when a user executes an activation operation of the vehicle detection application, the processor 92 of the client terminal 90 activates and executes the vehicle detection application and displays the vehicle search screen WD1 (see FIG. 8, for example) on the display 94 (SU). After Step St1, the processor 92 generates the vehicle information request based on a user's operation for inputting various search conditions to the vehicle search screen WD1 and sends the vehicle information request to the vehicle search server 50 via the communication unit 93 to execute the search (St2).

The processor 92 receives and acquires the data of the vehicle search result obtained by the search of the vehicle search server 50 in Step St2 via the communication unit 93, and then the processor 92 generates and displays the search result screen WD2 (see FIG. 11, for example). The processor 92 sends the data of the search result as case data to the case DB56b of the vehicle search server 50 via the communication unit 93 by a user's operation such that the data of the search result is stored in the case DB56b. As a result, the vehicle search server 50 can store the case data sent from the client terminal 90 in the case DB56b.

Then, the processor 92 accepts the input of a user's operation for displaying the case screen WD3 in the vehicle detection application (St3). After Step St3, the processor 92 acquires the case data stored in the case DB56b of the vehicle search server 50 and generates and displays the case screen WD3 in which the vehicle thumbnail image as the search result of Step St2 and the passing direction on the map when the vehicle corresponding to the vehicle thumbnail image passes through the intersection are associated with each other using the case data (St4).

In FIG. 14, the processor 92 accepts and sets the input of various search conditions (see above) by a user's operation on the vehicle search screen WD1 displayed on the display 94 (St2-1). The processor 92 generates a vehicle information request including the search conditions set in Step St2-1 and sends it to the vehicle search server 50 via the communication unit 93 (St2-2).

Based on the vehicle information request sent from the client terminal 90, the vehicle search unit 53 of the vehicle search server 50 searches the detection information DB56a of the storage unit 56 for vehicles satisfying the search conditions included in the vehicle information request. The vehicle search unit 53 sends the data of the search result (that is, the vehicle information satisfying the search conditions included in the vehicle information request) to the client terminal 90 via the communication unit 51 as a response to the vehicle information request.

The processor 92 of the client terminal 90 receives and acquires the data of the search result sent from the vehicle search server 50 via the communication unit 93. The processor 92 generates the search result screen WD2 using the data of the search result and displays it on the display 94 (St2-3).

In FIG. 15, the processor 92 sends an acquisition request of the case data to the vehicle search server 50 via the communication unit 93 to read the case data stored in the case DB56b of the vehicle search server 50 (St4-1). The vehicle search server 50 reads the case data (specifically, a vehicle thumbnail image, map information, and information indicating the flow-in/flow-out directions of a vehicle) corresponding to the acquisition request sent from the client terminal 90 from the case DB56b and sends it to the client terminal 90. The processor 92 of the client terminal 90 acquires the case data sent from the vehicle search server 50 (St4-2).

The processor 92 repeats the loop processing consisting of Steps St4-3, St4-4, and St4-5 for each vehicle thumbnail image using the corresponding case data (that is, individual case data corresponding to the number of vehicle thumbnail images) acquired in Step St4-2 to generate and display the case screen WD3 (see FIG. 12, for example).

Specifically, in the loop processing performed for each registered vehicle (in other words, vehicle corresponding to the vehicle thumbnail image included in the case data), the processor 92 arranges and displays the vehicle thumbnail image on the case screen WD3 (St4-3) and arranges and displays the map when the registered vehicle passes through the intersection on the case screen WD3 (St4-4), and then the processor 92 displays the respective directions indicating the flow-in and flow-out directions of the vehicle in a state where the respective directions are superimposed on the map (St4-5).

Next, an operation principle of narrowing down a camera at an intersection where a tracking target vehicle is predicted to pass during a tracking mode of the vehicle detection system 100 according to the first embodiment will be described with reference to FIGS. 16 to 19. FIGS. 16 to 19 are principle diagrams of the operation of narrowing down the camera at the intersection where the tracking target vehicle is predicted to pass. In the description of FIGS. 16 to 19, the same components as those illustrated in the drawings will be denoted by the same reference numerals to simplify or omit the description.

In order to make the description of FIGS. 16 to 19 easy to understand, it is assumed that one camera (specifically, camera CM11, CM12, CM13, CM14, CM15, CM16, CM17, CM18, or CM19) is disposed at each intersection in the figures. The internal configuration of each of the cameras CM11 to CM19 is the same as that of the cameras 10, 10a, . . . illustrated in FIG. 2.

Here, for example, it is assumed that the vehicle causes some sort of incident (for example, a breakout and an unauthorized breach of a drinking check) at an intersection where the camera CM15 is installed. The client terminal 90 sends, in response to a transition operation (see the matters described later) to the tracking mode for tracking a vehicle (in other words, a tracking target vehicle by a police officer who is a user of the client terminal 90) which has gotten away from an incident site, an instruction (see above) on designation of the tracking target vehicle having a role as an execution request of a tracking process of the tracking target vehicle to the vehicle search server 50.

When the vehicle search server 50 receives the instruction on the designation of the tracking target vehicle sent from the client terminal 90, the vehicle search server 50 analyzes the captured image of the camera CM15 corresponding to information of the intersection included in the instruction, as the tracking process of the tracking target vehicle. In addition, the vehicle search server 50, by this analysis, detects (see FIG. 16) that the vehicle (that is, the vehicle on which the criminal who caused the incident is riding) has gotten away to the south (that is, the direction toward the intersection where the camera CM18 is disposed), and specifies that the camera to be searched next (in other words, the camera that the tracking target vehicle is highly likely to enter next) is the camera CM18, as the tracking process of the tracking target vehicle. The vehicle search server 50 stores the analysis result (tracking process result) including the analysis date and time and the camera information of the camera CM18 to be searched next in the storage unit 56 of the vehicle search server 50 in association with the identification information of the tracking target vehicle. The vehicle search server 50 sends the analysis result (tracking process result) described above to the client terminal 90.

Figure 17:
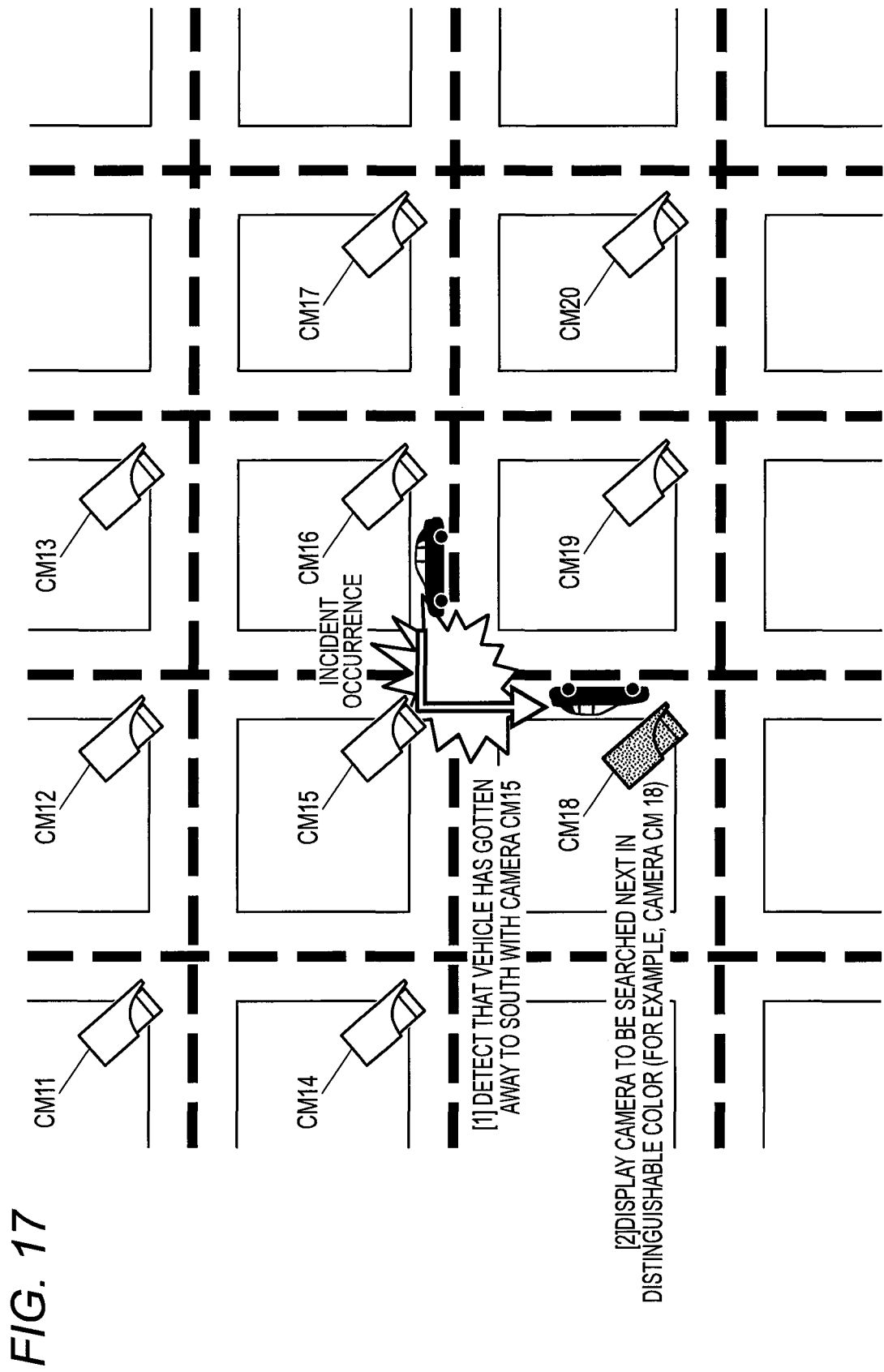
Figure 18:
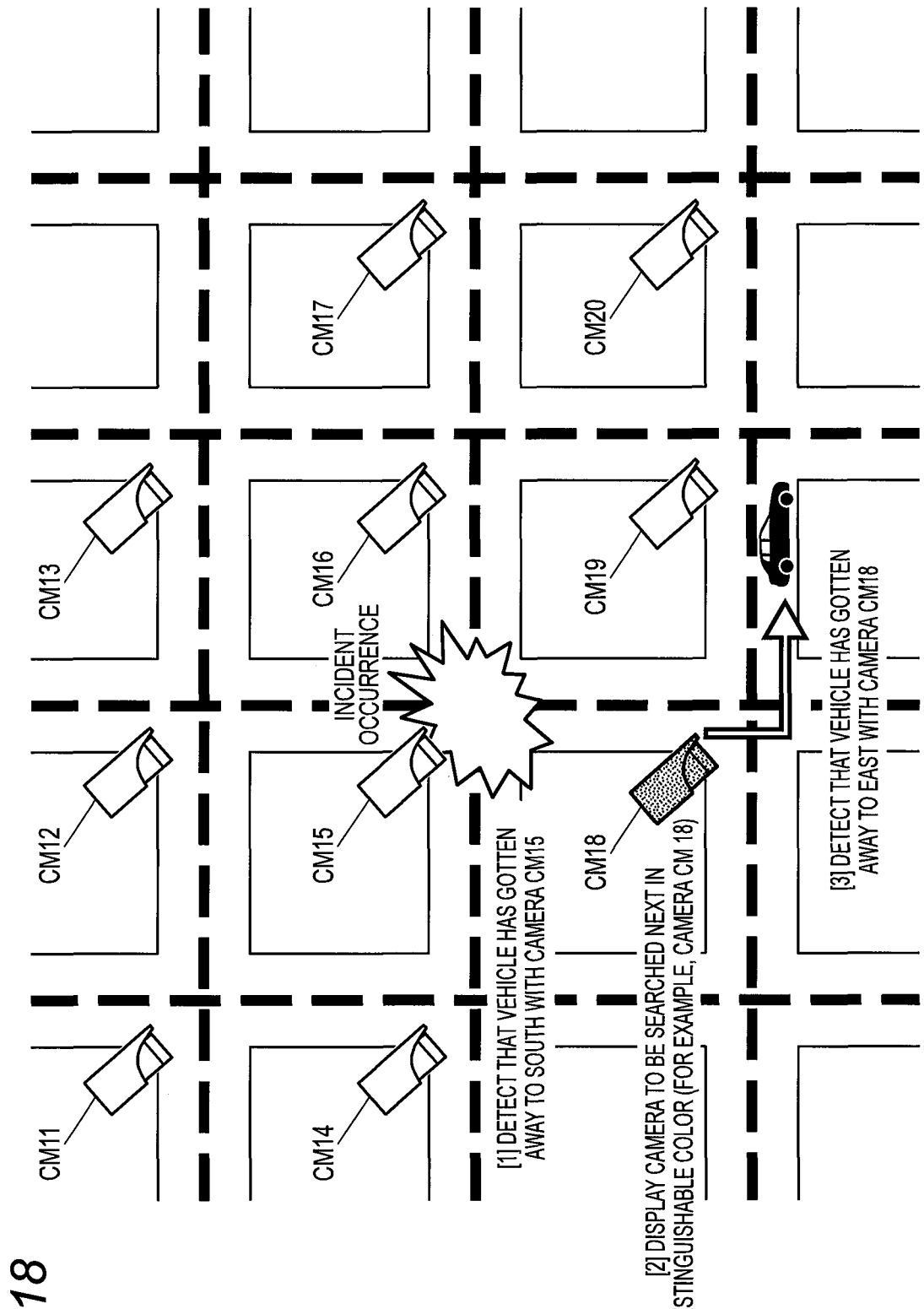

When the analysis result sent from the vehicle search server 50 is received, the client terminal 90 displays the icon of the camera CM18 corresponding to the camera information of the camera to be searched next in a distinguishable color as compared with other cameras in the road map where the intersections and roads common to FIGS. 16 to 19 are shown (see FIG. 17). With this configuration, the user (for example, a police officer) can intuitively and visually grasp an intersection where the tracking target vehicle, which has gotten away and caused an incident at the intersection where the camera CM15 is installed, is highly likely to appear next, and can perform efficient investigations.

Further, when in the tracking mode, the vehicle search server 50 analyzes the captured image of the camera CM18 specified as the camera to be searched next, as the tracking process of the tracking target vehicle. The vehicle search server 50, by this analysis, detects that the tracking target vehicle has gotten away to the east (that is, the direction to the intersection where camera CM 19 is disposed) (see FIG. 18), and specifies that the camera to be searched next is the camera CM19 and specifies that the camera to be searched next (in other words, the camera that the tracking target vehicle is highly likely to enter next) is the camera CM19, as the tracking process of the tracking target vehicle. The vehicle search server 50 stores the analysis result (tracking process result) including the analysis date and time and the camera information of the camera CM19 to be searched next in the storage unit 56 of the vehicle search server 50 in association with the identification information of the tracking target vehicle. The vehicle search server 50 sends the analysis result (tracking process result) described above to the client terminal 90.

Figure 19:
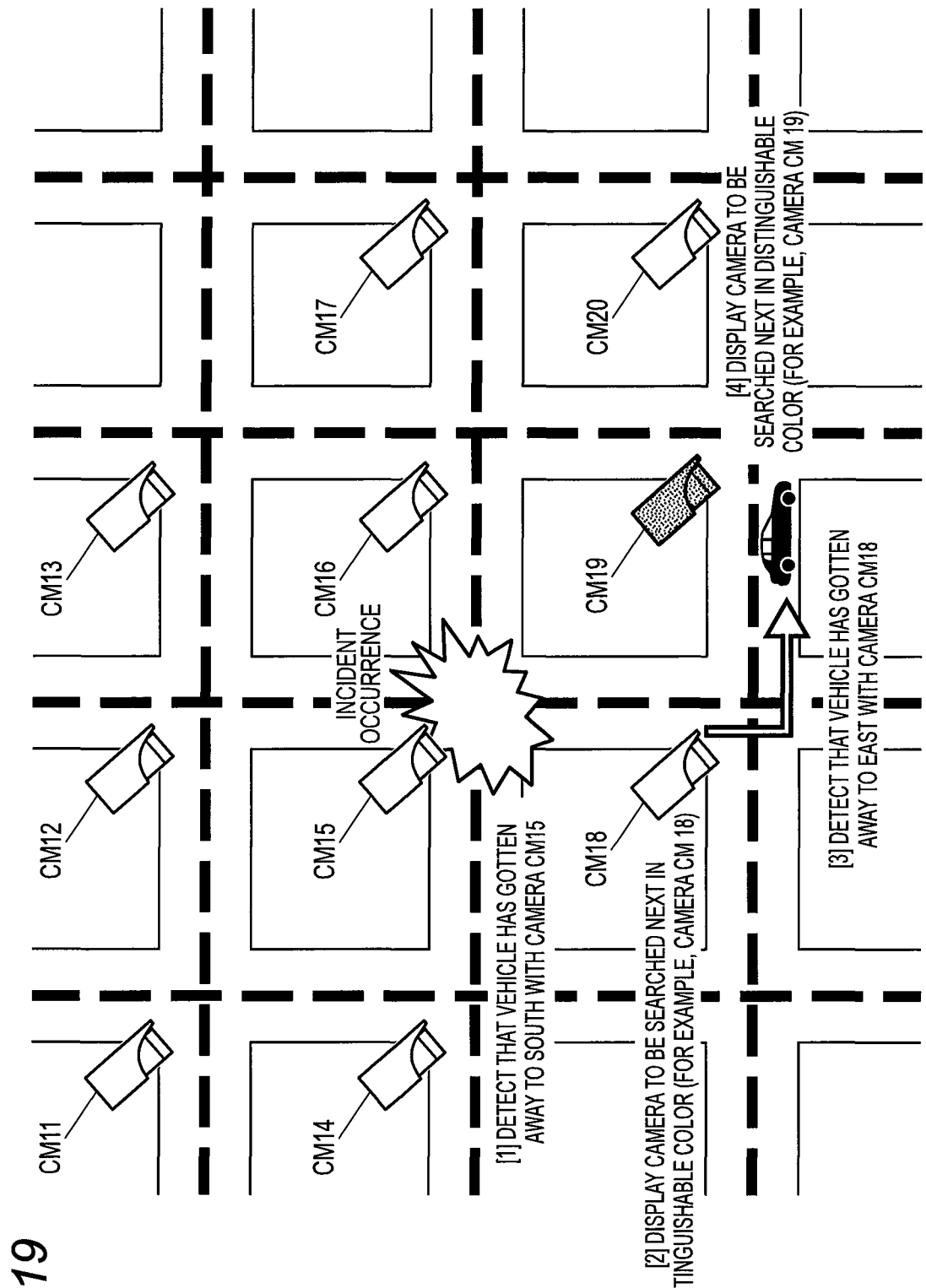

When the analysis result sent from the vehicle search server 50 is received, the client terminal 90 displays the icon of the camera CM19 corresponding to the camera information of the camera to be searched next in a distinguishable color as compared with other cameras in the road map where the intersections and roads common to FIGS. 16 to 19 are shown (see FIG. 19). With this configuration, the user (for example, a police officer) can intuitively and visually grasp an intersection where the tracking target vehicle, which has gotten away and caused an incident at the intersection where the camera CM15 is installed, is highly likely to appear next to the intersection where the camera CM18 is installed, and can perform efficient investigations.

Next, an example of a vehicle tracking screen WD4 displayed on the client terminal 90 in the tracking mode will be described with reference to FIGS. 20 to 23. In the description of FIGS. 20 to 23, the same components as those described with reference to FIGS. 8 to 10 will be denoted by the same reference numerals to simplify or omit the description.

Figure 20:
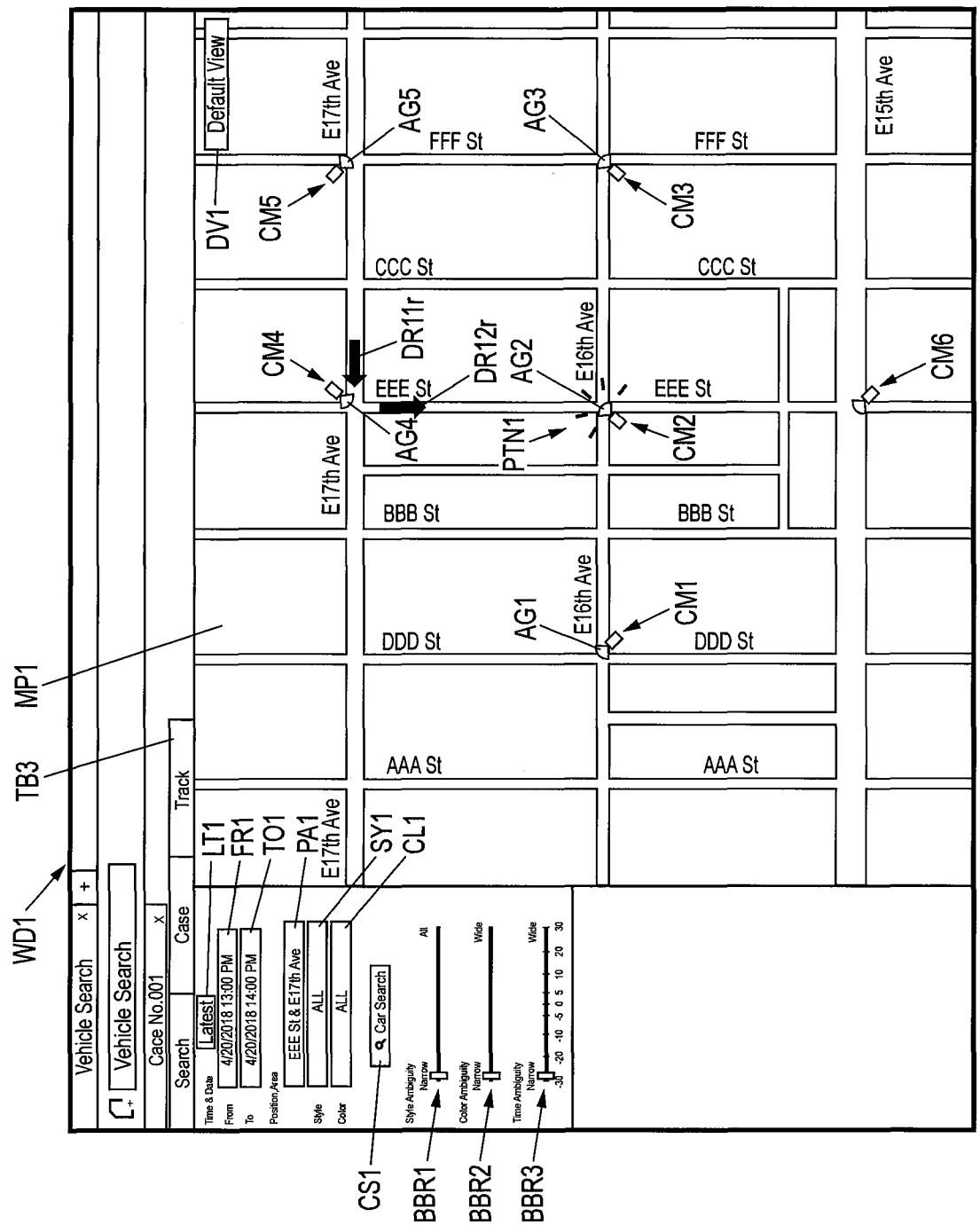
FIG. 20 is a diagram illustrating an example of a vehicle tracking screen displayed in the tracking mode.

FIG. 20 is a diagram illustrating an example of the vehicle tracking screen WD4 displayed in the tracking mode. Here, the tracking mode is a mode that, when a vehicle on which a suspect who has caused an incident or the like is highly likely to be ridden is designated as a tracking target vehicle by the client terminal 90, causes the vehicle search server 50 to execute the tracking process (for example, an analysis process of a captured image of a camera for the purpose of tracking a tracking target vehicle and a specifying process of a camera to be searched next) of the tracking target vehicle. The result of the tracking process in the vehicle search server 50 is fed back to the client terminal 90, and the result is displayed on the display 94 of the client terminal 90.

For example, on the screen (see FIG. 12) on which vehicle thumbnail images SM1 to SM4 of vehicles are associated with road map MP1 indicating the passing direction when each vehicle passes through the intersection, the processor 92 of the client terminal 90 displays a tracking button PS1 on the periphery of the vehicle thumbnail image SM2 by a predetermined user's operation on a vehicle thumbnail image (for example, the vehicle thumbnail image SM2) of any vehicle. Furthermore, when detecting that the displayed tracking button PS1 is specified by the user's operation, the processor 92 generates an instruction to set the vehicle corresponding to the designated vehicle thumbnail image SM2 as the tracking target vehicle. This instruction includes at least, for example, identification information of a vehicle designated as a tracking target vehicle (for example, a vehicle of the vehicle thumbnail image SM2), information of an intersection (for example, an intersection where the camera CM4 is installed) where the tracking target vehicle has passed, the advancing direction (for example, direction DR12r) when passing through the intersection, and a transition instruction to a tracking mode for tracking the designated tracking target vehicle.

When selection (for example, a click) of the road map MP1 displayed in association with a vehicle thumbnail image (for example, the vehicle thumbnail image SM2) to be a tracking target vehicle is detected, the processor 92 may create an instruction (see above) to set the vehicle corresponding to the designated vehicle thumbnail image SM2 as the tracking target vehicle.

When the processor 92 generates the instruction to set the tracking target vehicle (see above), the processor 92 sends an instruction to set the tracking target vehicle to the vehicle search server 50 via the communication unit 93. When an instruction on the designation of the tracking target vehicle sent from the client terminal 90 is received, the vehicle search server 50 transitions to the tracking mode, and analyzes the captured image of the camera CM4 corresponding to the information of the intersection included in the instruction in the vehicle search unit 53 as the tracking process of the tracking target vehicle. The vehicle search unit 53, by this analysis, detects that the tracking target vehicle has moved south of the intersection of the camera CM4, and thus specifies that the camera (in other words, the camera that the tracking target vehicle is highly likely to enter next) to be searched next is the camera CM2, as the tracking process of the tracking target vehicle. The vehicle search unit 53 sends the analysis result (tracking process result) described above to the client terminal 90 via the communication unit 51.

When the analysis result sent from the vehicle search server 50 is received, the processor 92 of the client terminal 90 displays a vehicle tracking screen WD4 shown by a tracking tab TB3. The vehicle tracking screen WD4 has a configuration in which, for example, both the road map MP1 corresponding to the information of the road map recorded in the recording unit 96 of the client terminal 90 and the input fields of the plurality of search conditions specified by the search tab TB1 are displayed side by side.

The processor 92 displays the icon of the camera CM2 to be searched next which is specified by the vehicle search server 50 on the vehicle tracking screen WD4 with a display pattern PTN1 that can be identified as compared with the icons of other cameras. The display pattern PTN1 corresponds to, for example, a mode in which the color of the icon of the camera CM2 is displayed differently from the icons of the other cameras. The display pattern PTN1 corresponds to, for example, a mode in which the icon of the camera CM2 is blinked and displayed. The display pattern PTN1 is not limited to these modes. With this configuration, the user (for example, a police officer) can intuitively and visually grasp an intersection (that is, an intersection of the camera CM2) where the tracking target vehicle, which is getting away south of the intersection of camera CM4, is highly likely to appear next, and can perform efficient investigations.

Also, the processor 92 displays the arrow icon, which indicates the passing direction (specifically, a direction DR11r indicating the flow-in direction and a direction DR12r indicating the flow-out direction) when passing through the intersection of the camera CM4 corresponding to the vehicle thumbnail image SM2 designated as the tracking target vehicle, in a state where the arrow icon is superimposed on the corresponding position of the road map MP1, on the vehicle tracking screen WD4 (see FIG. 20). With this configuration, the user can visually and intuitively grasp the passing direction of the intersection where the tracking target vehicle has passed at the corresponding position of the road map MP1.

Figure 21:
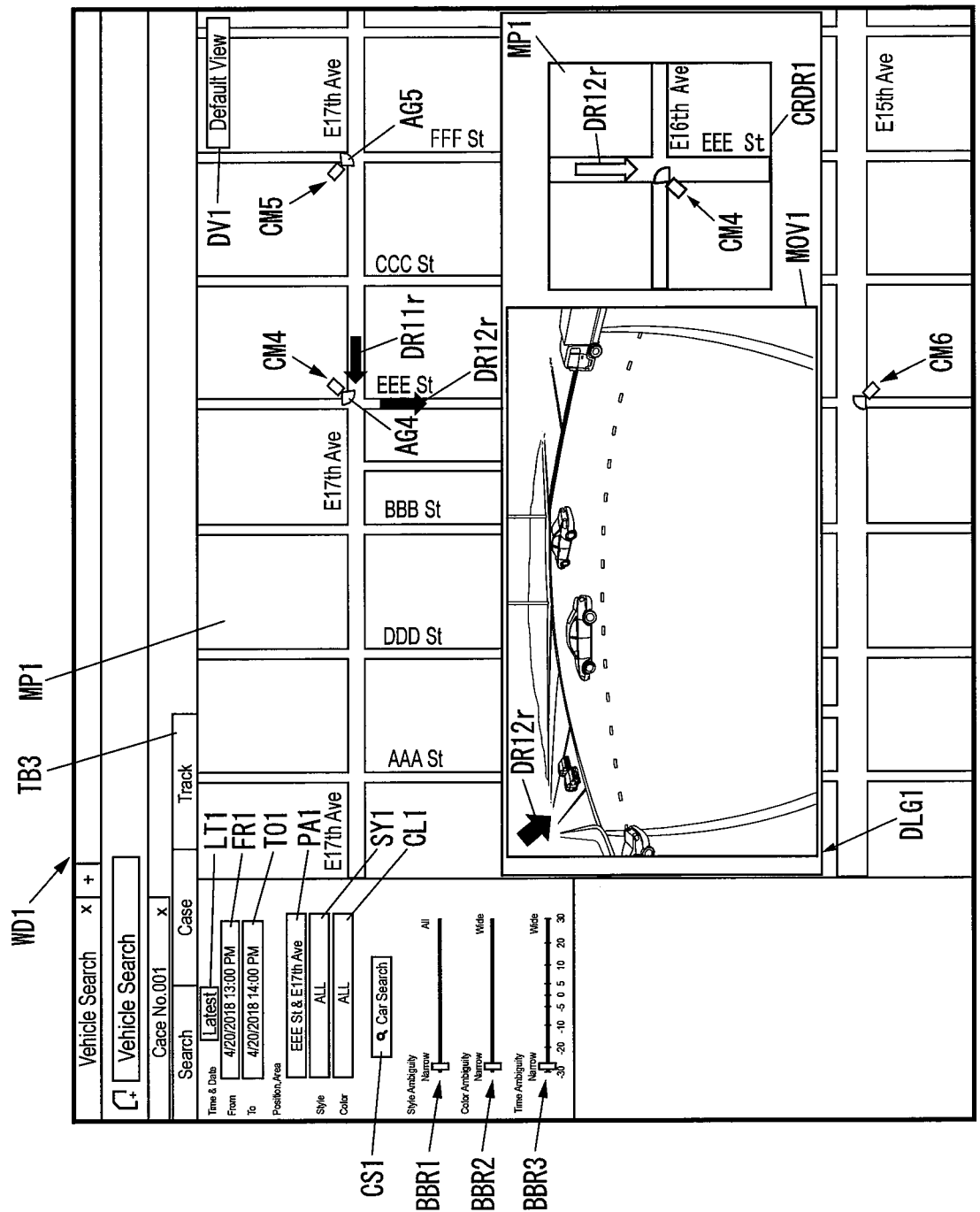
FIG. 21 is a diagram illustrating an example of an image reproduction dialog displayed by designation of a camera icon.

FIG. 21 is a view illustrating an example of an image reproduction dialog DLG1 displayed by designation of the icon of the camera CM2. In FIG. 21, the image reproduction dialog DLG1, which is displayed by the processor 92 when it is detected by the processor 92 that the icon of the camera CM2, which is shown identifiably as compared with the icons of the other cameras in FIG. 20, is pressed by the user's operation, is shown. The processor 92 displays the image reproduction dialog DLG1 in a state where the image reproduction dialog DLG1 is superimposed on a part of the display area of the road map MP1, for example. The image reproduction dialog DLG1 has a configuration in which a live image screen MOV1 and an intersection passing direction screen CRDR1 are disposed in association with each other. The live image screen MOV1 is a display screen of a captured image (that is, the current live image) captured by the camera CM2 specified by the vehicle search server 50 as a camera to be searched next. The intersection passing direction screen CRDR1 is a screen on which an entry direction (that is, the direction DR12r indicating the flow-in direction) of the tracking target vehicle highly likely to enter the intersection is superimposed on the road map MP1 within a predetermined distance including the intersection of the camera CM2 displayed on the live image screen MOV1. On the live image screen MOV1, an arrow icon indicating the direction DR12r in which the tracking target vehicle is predicted to enter the intersection of "EEE St. & E16th Ave" where the camera CM2 is installed may be displayed. With this configuration, since the user can carefully check from which direction the tracking target vehicle approaches the intersection of the camera CM2 while viewing the live image screen MOV1, the investigation can be streamlined.

Figure 22:
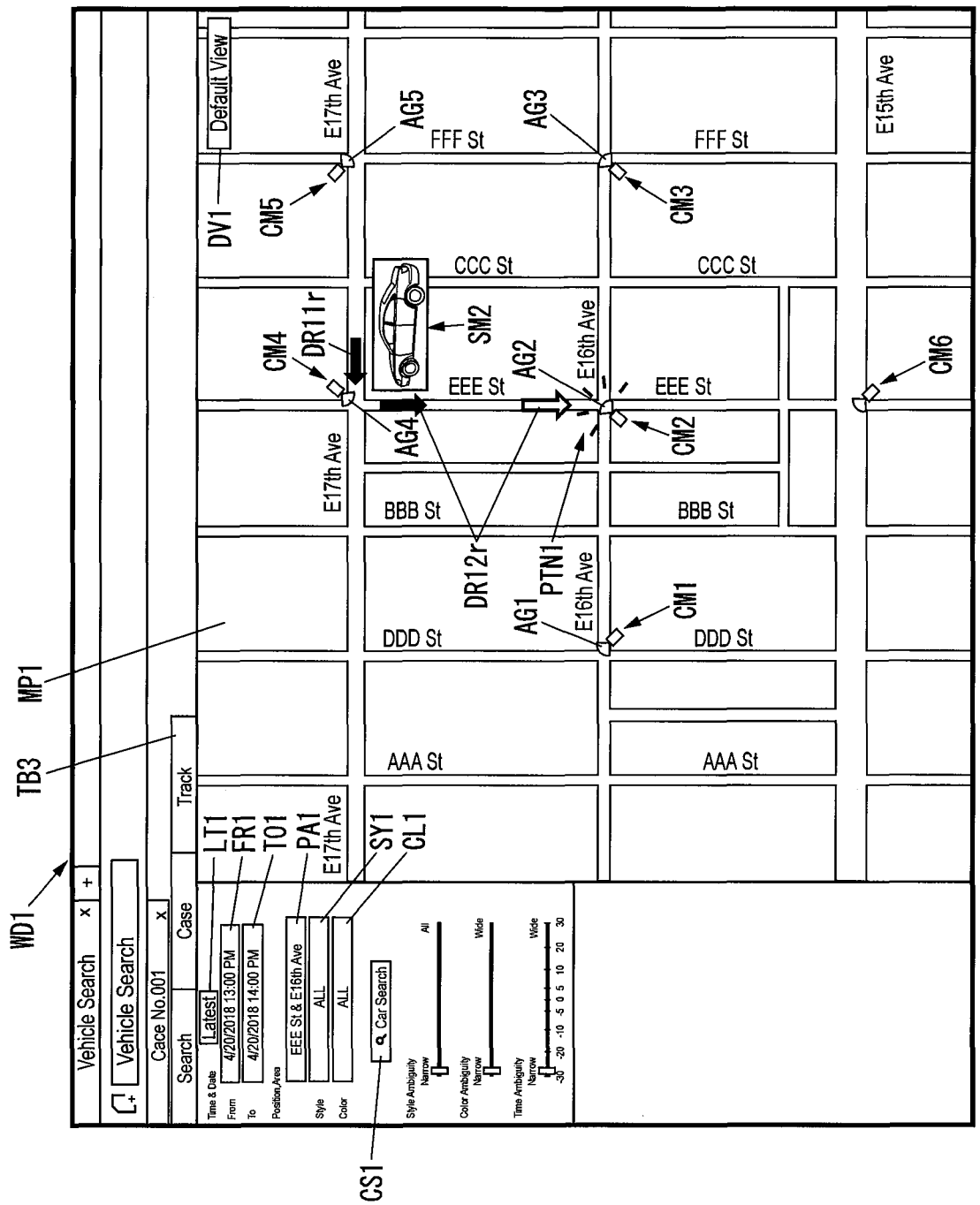
FIG. 22 is a diagram illustrating another example of the vehicle tracking screen.

FIG. 22 is a diagram illustrating another example of the vehicle tracking screen WD4. In the description of FIG. 22, the same elements as the elements illustrated in FIG. 20 will be denoted by the same reference numerals to simplify or omit the description, and different contents will be described. The processor 92 of the client terminal 90 displays the vehicle thumbnail image SM2 designated by a user's operation as a tracking target vehicle in a state where the vehicle thumbnail image SM2 is superimposed on the periphery of the intersection (that is, the intersection of the camera CM4) corresponding to the vehicle thumbnail image SM2 on the road map MP1 on the vehicle tracking screen WD4. With this configuration, the user can confirm the vehicle thumbnail image SM2 of the tracking target vehicle on the road map MP1 in an easily understandable manner by visual observation.

Based on the specified result of the camera (in other words, the camera that the tracking target vehicle is highly likely to enter next) to be searched next by the vehicle search server 50, the processor 92 may automatically update the position of the intersection of the camera CM2 (for example, "EEE St. & E16th Ave") corresponding to the specified result in the position area input field PA1 of the vehicle tracking screen WD4. With this configuration, the user can save time and effort in inputting the place name of the intersection where the camera to be searched next is installed in the position area input field PA1, and convenience at the time of the investigation is improved.

Based on the specified result of the camera (in other words, the camera that the tracking target vehicle is highly likely to enter next) to be searched next by the vehicle search server 50, the processor 92 may set the direction DR12r, in which the tracking target vehicle enters the camera CM2 corresponding to the specified result, as the search condition used for the next search. With this configuration, since the entry direction (flow-in direction) to the intersection where the camera to be searched next is installed is automatically set as the search condition, the user can save the time and effort to set by the user's operation, and convenience at the time of investigation is improved.

Figure 23:
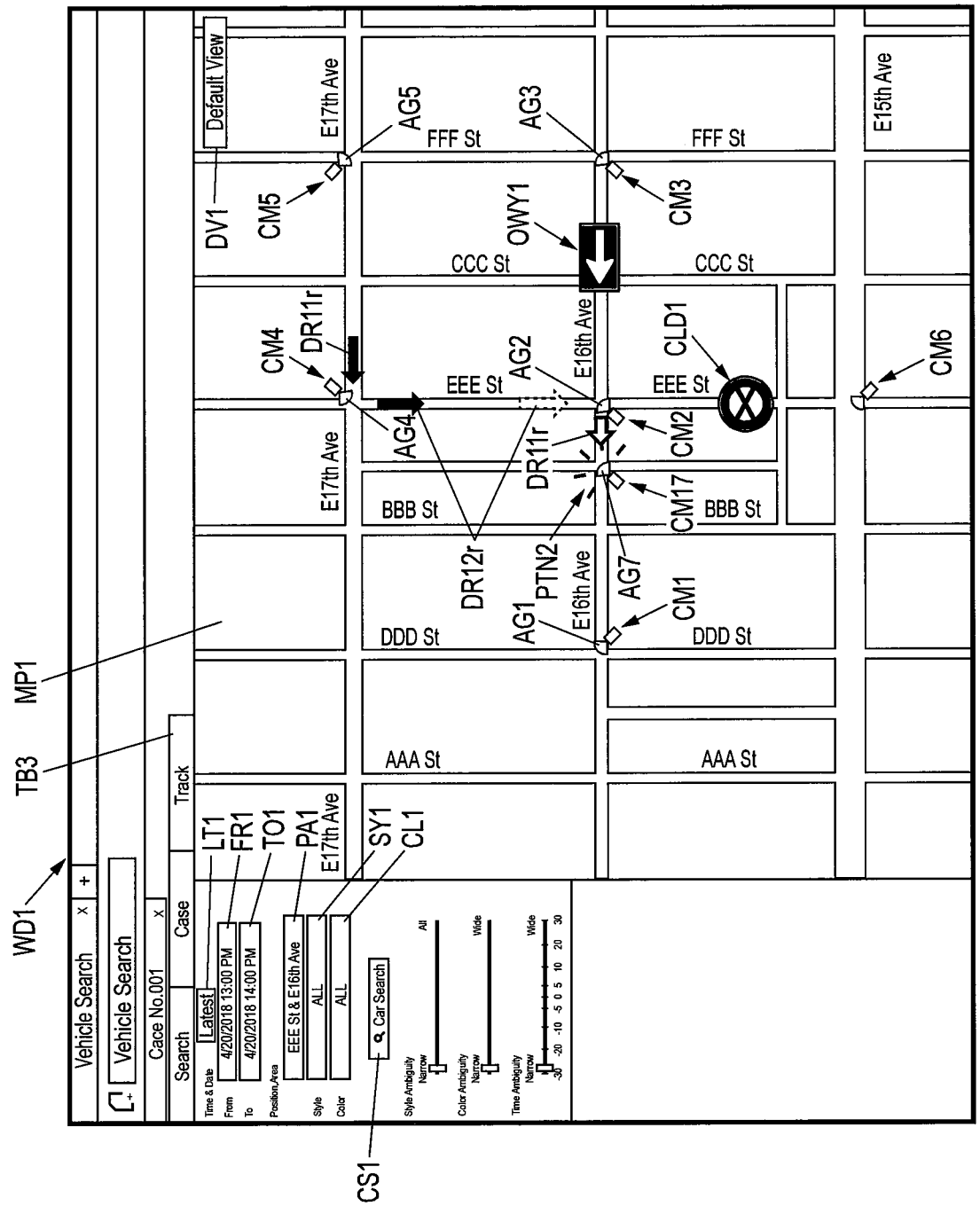
FIG. 23 is a diagram illustrating another example of the vehicle tracking screen.

FIG. 23 is a diagram illustrating another example of the vehicle tracking screen WD4. In the description of FIG. 23, the same elements as the elements illustrated in FIG. 20 or 22 are denoted by the same reference numerals to simplify or omit the description, and different contents will be described. When in the tracking mode, the client terminal 90 receives the specified result of the camera to be searched next after the tracking target vehicle (for example, the vehicle of the vehicle thumbnail image SM2) passes through the camera CM2 from the vehicle search server 50 each time and displays it on the vehicle tracking screen WD4 so as to be identifiable. In this case, for example, when searching for a camera to be searched next to the camera CM2, the vehicle search server 50 acquires road information of an area including the cameras CM4 and CM2 in real time through the Internet and the like, and executes the search after taking this road information into consideration as a search condition as well.

For example, as illustrated in FIG. 23, the "EEE St." road on the south side heading to the camera CM6 (installed at the intersection of the "EEE St." road and the "E15th Ave" road) from the camera CM2 is prohibited from passing (see traffic prohibition sign CLD1). The road "EEE St." south of the camera CM2 may be always prohibited from passing, or may be prohibited from passing depending on a time zone. The icon of the traffic prohibition sign CLD1 or the icon and information of the traffic time zone may be sent from the vehicle search server 50 to the client terminal 90 and displayed on the vehicle tracking screen WD4 by the client terminal 90.

Further, as illustrated in FIG. 23, the road "E16th Ave" on the east of the camera CM2 is one-way traffic to the west (see the one-way traffic sign OWY1). The road "E16th Ave" on the east of the camera CM2 may be always one-way traffic to the west or may be one-way traffic to the west depending on the time zone. The icon of the one-way traffic sign OWY1 or the icon and information of one-way traffic time zone may be sent from the vehicle search server 50 to the client terminal 90 and displayed on the vehicle tracking screen WD4 by the client terminal 90.

Based on such road information, the current time, and the advancing direction of the tracking target vehicle to the camera CM2, the vehicle search unit 53 of the vehicle search server 50 may specify a camera to be searched next to the camera CM2 (in other words, a camera that the tracking target vehicle is highly likely to appear next). For example, in FIG. 23, as cameras to be searched next to the camera CM2, the vehicle search unit 53 specifies a camera at an intersection closest to the camera CM2 on the road (that is, the camera CM7 having an imaging view angle of AG7) obtained by excluding the road of "EEE St." and a road (for example, the road to the west of "E16th Ave"), which is obtained by excluding the road to the east of "E16th Ave" from the position of camera CM2, from among the roads in the area including camera CM2. The vehicle search unit 53 sends an analysis result (tracking process result) including the specified result on specification of the camera CM7 to the client terminal 90 via the communication unit 51.

When the analysis result sent from the vehicle search server 50 is received, the processor 92 of the client terminal 90 displays the vehicle tracking screen WD4 shown by the tracking tab TB3. The processor 92 displays the icon of the camera CM7 to be searched next which is specified by the vehicle search server 50 in the vehicle tracking screen WD4 with a display pattern PTN 2 which can be identified as compared with the icons of other cameras. A display pattern PTN2 corresponds to, for example, a mode in which the color of the icon of the camera CM7 is displayed differently from the icons of the other cameras. Further, the display pattern PTN2 corresponds to, for example, a mode in which the icon of the camera CM7 is blinked and displayed. The display pattern PTN2 is not limited to these modes. With this configuration, the user (for example, a police officer) can intuitively and visually grasp an intersection (that is, the intersection of camera CM7) where a tracking target vehicle is highly likely to appear next realistically, after taking into consideration the road information (for example, a road situation) of the area including the intersection of the camera CM2, and can perform efficient investigation.

Figure 24:
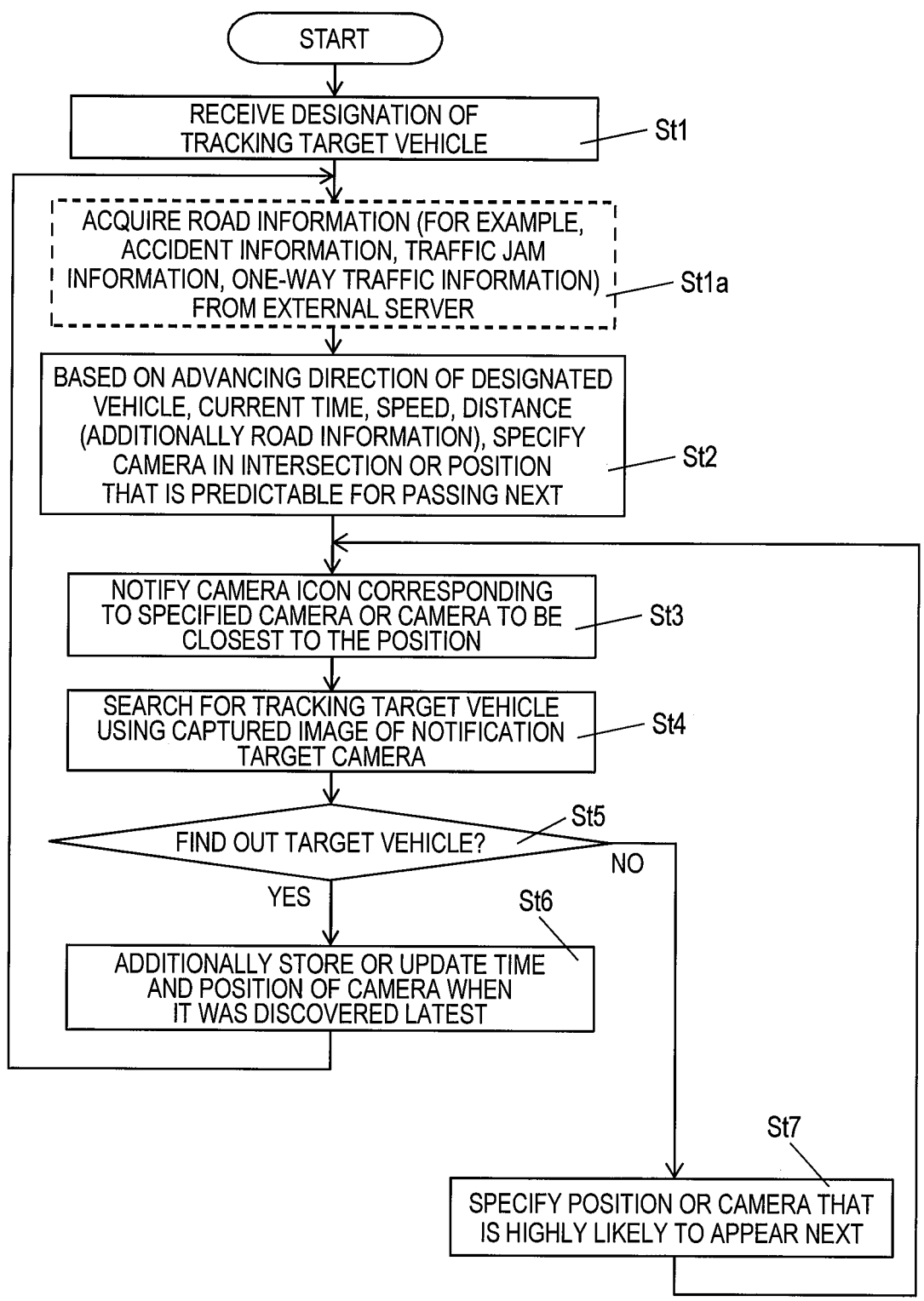
FIG. 24 is a flowchart illustrating an operation procedure example in tracking mode.

Next, an operation procedure example in the tracking mode of the vehicle detection system 100 according to the first embodiment will be described with reference to FIG. 24. FIG. 24 is a flowchart illustrating an operation procedure example in the tracking mode. As a premise of the description of FIG. 24, the screen illustrated in FIG. 12 (that is, the screen in which vehicle thumbnail images SM1 to SM4 as vehicle search results are associated with the road map MP1 indicating the passing direction of each vehicle at the time of passing through the intersection) is displayed on the display 94 of the client terminal 90.

In FIG. 24, the processor 92 of the client terminal 90 displays the tracking button PS1 on the periphery of the vehicle thumbnail image SM2 by a predetermined user's operation on a vehicle thumbnail image (for example, the vehicle thumbnail image SM2) of any one of the vehicles. When it is detected that the displayed tracking button PS1 is designated by the user's operation, the processor 92 receives the designation of the tracking target vehicle, and generates an instruction to set the vehicle corresponding to the designated vehicle thumbnail image SM2 as the tracking target vehicle (St11). When the processor 92 generates an instruction to set the tracking target vehicle (see above), the processor 92 sends an instruction to set the tracking target vehicle to the vehicle search server 50 via the communication unit 93. The instruction includes, for example, at least identification information of a vehicle (for example, the vehicle of the vehicle thumbnail image SM2) designated as the tracking target vehicle, information of an intersection (for example, the intersection where the camera CM4 is installed) through which the tracking target vehicle has passed, an advancing direction (for example, the direction DR12r) when the intersection passes, and a transition instruction to a tracking mode for tracking the designated tracking target vehicle.

The vehicle search server 50 acquires road information of the area including the intersection from the external server (not illustrated) through the Internet using the information on the intersection included in the instruction to set the vehicle to the tracking target vehicle (St11a). This road information includes information on roads that exist always or according to a time zone, and includes, for example, road accident information and traffic jam information as the latest road information, or information indicating whether one-way traffic is set or not. The process of step St11a is not essential, and may be executed according to the specification (for example, high end or low end) of the vehicle detection system 100 (high end specification) or may be omitted (low end specification). In the following, the process of step St11a will be described as being executed.

When an instruction relating to designation of the tracking target vehicle sent from the client terminal 90 is received, the vehicle search server 50, the vehicle search unit 53 analyzes a captured image of a camera corresponding to the information of the intersection (that is, the intersection that the tracking target vehicle passed immediately before) included in the instruction, as the tracking process of the tracking target vehicle. Specifically, the vehicle search unit 53 specifies a camera to be searched next (in other words, a camera that the tracking target vehicle is highly likely to enter next) or the position of the camera as the tracking process of the tracking target vehicle (St12), based on the passing direction (advancing direction) when the tracking target vehicle passed the intersection immediately before, the current time, the vehicle speed of the tracking target vehicle when passing through the intersection, the predetermined distance, and road information (see step St11a) road (St12). The predetermined distance is, for example, a distance to an adjacent intersection where the cameras are installed at equal intervals or within a predetermined distance. The vehicle search unit 53 sends the analysis result (tracking process result) described above to the client terminal 90 via the communication unit 51.

When the analysis result sent from the vehicle search server 50 is received, the processor 92 of the client terminal 90 displays the vehicle tracking screen WD4 indicated by the tracking tab TB3. The processor 92 displays the icon of the camera CM2 to be searched next which is specified by the vehicle search server 50 on the vehicle tracking screen WD4 with the display pattern PTN1 which can be identified as compared with the icons of other cameras (St13).

When the vehicle search server 50 is in the tracking mode, the vehicle search unit 53 searches for the tracking target vehicle using the captured image of the camera (for example, the camera CM2 illustrated in FIG. 20) specified in step St12 (St14). When it is determined that the tracking target vehicle is detected (YES in St15), the vehicle search unit 53 additionally stores the time when the tracking target vehicle was detected (discovered) and the position of the camera (for example, camera CM2) corresponding to the captured image used as the search target in the storage unit 56 in association with each other or updates the storage unit 56 (St16). These pieces of information are used in the specifying process of a camera to be searched next to specify the camera to be searched next. After processing of step St16, the process of the vehicle detection system 100 returns to step St11a, or step St11a or step St12 if step St11a is omitted, and the processing of step St11a or step St12 to step St16 or step St17 is repeated.

On the other hand, when it is determined that the tracking target vehicle is not detected (NO in St15), the vehicle search unit 53 specifies the position of the intersection that the tracking target vehicle is highly likely to pass next or the camera installed at that position based on the passing direction (advancing direction) when the tracking target vehicle passed the previous intersection, the current time, the vehicle speed (speed) of the tracking target vehicle when passing through the intersection, the predetermined distance, and road information (see step St11a) (St17). After step St17, the process of the vehicle detection system 100 returns to step St13.

As described above, the vehicle detection system 100 according to the first embodiment includes the vehicle search server 50 communicably connected to each camera installed at each of a plurality of intersections, and the client terminal 90 communicably connected to the vehicle search server 50. The client terminal 90 displays, on the display 94, the visual features of each of the plurality of vehicles passing through the intersection (for example, the intersection of "EEE St. & E17th Ave") at the location where the incident or the like has occurred) and the road map MP1 (map data) in which the passing direction of the intersection of each vehicle is shown in association with each other, and sends, to the vehicle search server 50, the instruction to set the designated vehicle as a tracking target vehicle in response to designation of any one of the plurality of vehicles. When the instruction is received, the vehicle search server 50 specifies a camera at an intersection at which the tracking target vehicle is highly likely to enter next based on at least the current time and the advancing direction of the intersection of the tracking target vehicle, and sends camera information of the identified camera to the client terminal 90. When the camera information is received, the client terminal 90 displays the position of the camera corresponding to the camera information on the display 94 so as to be identifiable in a state where the position of the camera is superimposed on the road map MP1.

With this configuration, for example, when an incident or the like occurs at an intersection where many people or vehicles come and go, the vehicle detection system 100 can display, on the display 94 of the client terminal 90, the intersection at which the tracking target vehicle is highly likely to appear next in a manner that allows the user to identify the intersection. Accordingly, the vehicle detection system 100 can efficiently reduce the time and effort spent on narrowing down the vehicle which has gotten away from the intersection where the incident or the like has occurred, and thus can efficiently assist early detection of a suspect or a criminal of the incident or the like by the user.

The vehicle search server 50 stores the specified camera information in the storage unit 56 as information indicating the travelling route of the tracking target vehicle. With this configuration, after transitioning to the tracking mode according to the instruction sent from the client terminal 90, the vehicle search server 50 can efficiently search for and specify the travelling route (for example, the intersection where the camera, which is highly likely to appear next, is installed) of the tracking target vehicle.

The vehicle search server 50 specifies a camera of an intersection where the tracking target vehicle is highly likely to enter next based on the current time, the passing direction of the tracking target vehicle passing through the intersection, and the distance from the intersection. With this configuration, the vehicle search server 50 can efficiently narrow down the intersections where the tracking target vehicle is highly likely to appear next.

When a camera corresponding to camera information is designated by a user's operation, the client terminal 90 sends an acquisition request for the captured image of the camera to the vehicle search server 50 and displays the display screen of the captured image of the camera sent from the vehicle search server 50 in the display 94 in response to the acquisition request. With this configuration, after the camera predicted to appear next, which is extracted based on the passing direction of the tracking target vehicle when passing through the intersection and the like, is notified identifiably on the display 94, the user can visually confirm the situation in which the tracking target vehicle approaches the camera through the reproduction screen by confirming the reproduction screen of the camera. Accordingly, according to the vehicle detection system 100, the investigation of the user (police officer) can be efficiently assisted.

The client terminal 90 displays the direction in which the tracking target vehicle enters in a distinguishable manner on the display screen. With this configuration, the user can visually and intuitively grasp the passing direction of the intersection at which the tracking target vehicle has passed to the corresponding position of the road map MP1 through the display screen of the captured image of the camera to be searched next.

When the road map MP1 (map data) indicating a passing direction of any vehicle passing through an intersection is designated by a user's operation, the client terminal 90 sends the instruction (see above) to set the vehicle as the tracking target vehicle to the vehicle search server 50. With this configuration, the user can cause the vehicle search server 50 to execute the tracking process of the tracking target vehicle by a simple selection operation such as clicking on the road map MP1 displayed in association with the vehicle thumbnail image of interest.

When the visual features of any vehicle is designated by a user's operation, the client terminal 90 sends an instruction (see above) to set the vehicle as the tracking target vehicle to the vehicle search server 50. With this configuration, the user can cause the vehicle search server 50 to execute the tracking process of the tracking target vehicle by a simple selection operation such as clicking on a vehicle thumbnail image of interest.

The client terminal 90 displays the passing direction of the tracking target vehicle passing through the intersection on the display device so as to be identifiable in a state where the passing direction is superimposed on the road map MP1 (map data). With this configuration, the user can visually and intuitively grasp the passing direction of the intersection where the tracking target vehicle has passed to the corresponding position of the road map MP1.

The client terminal 90 displays the color of the icon of the camera corresponding to the camera information differently from the icons of the other cameras. With this configuration, a camera that the tracking target vehicle is highly likely to appear next is displayed in a different color compared to other cameras, the user can easily grasp visually and intuitively at which position the camera which is highly likely to appear next is positioned.

The client terminal 90 also blinks and displays the camera icon corresponding to the camera information. With this configuration, the camera that the tracking target vehicle is highly likely to appear next is displayed to blink compared to other cameras, the user can easily grasp visually and intuitively at which position the camera with a high possibility that the tracking target vehicle appears next is positioned.

The client terminal 90 displays the visual features of the tracking target vehicle on the display device so as to be identifiable in a state where the visual features is superimposed on the periphery of the intersection of the road map MP1 (map data) on the display 94. With this configuration, the user can confirm the vehicle thumbnail image SM2 of the tracking target vehicle on the road map MP1 in an easily understandable manner by visual observation.

Further, the vehicle search server 50 acquires road information of an area including a plurality of intersections, and specifies a camera at an intersection at which the tracking target vehicle is highly likely to enter next, based on the current time, the passing direction of the tracking target vehicle passing through the intersection, and road information of the area. With this configuration, the user (for example, a police officer) can intuitively and visually grasp an intersection (that is, the intersection of camera CM7) where the tracking target vehicle is highly likely to appear next realistically, after taking into consideration the road information (for example, a road situation) of the area including the intersection of the camera CM2, and can perform efficient investigation.

The road information of the area includes traffic jam information of the road. With this configuration, the vehicle search server 50 can specify an intersection at which a camera is highly likely to appear next is installed with high accuracy by excluding a road in heavy traffic from the roads through which the tracking target vehicle passes.

The road information of the area includes construction information of the road. With this configuration, the vehicle search server 50 can specify an intersection at which a camera, which is highly likely to appear next, is installed with high accuracy by excluding a road under construction from the roads through which the tracking target vehicle passes.

The road information of the area includes one-way traffic information of the road. With this configuration, depending on the traveling direction of the tracking target vehicle, the vehicle search server 50 can specify an intersection at which a camera highly likely to appear next is installed with high accuracy by excluding or preferentially selecting a road in one-passage from the roads through which the tracking target vehicle passes.

The client terminal 90 sends, to the vehicle search server 50, an information acquisition request for a vehicle that has passed through an intersection at the location on the date and time, in response to input of information including the date and time and the location at which an incident or the like occurred and the features of the vehicle which caused the incident or the like. When the information acquisition request is received, the vehicle search server 50 extracts vehicle information and passing directions of a plurality of vehicles passing through the intersection at the location in association with each other using the captured image of the camera corresponding to the intersection of the location at the date and time, and sends the extracted result to the client terminal 90. The client terminal 90, on the display device 94, displays the visual features of the plurality of vehicles passing through the intersection at the location and the passing directions of the respective vehicles in association with each other using the extracted result. With this configuration, when an incident or the like occurs at an intersection where many people or vehicles come and go, the user can grasp simultaneously and at an early stage visual features such as the vehicle candidate extracted as a getaway vehicle and an getaway direction when passing through the intersection in the client terminal 90 used by himself/herself. Accordingly, since the vehicle detection system 100 can efficiently assist early detection of the getaway vehicle in the user's investigation, convenience of police investigation or the like can be accurately improved.

Hereinbefore, various embodiments are described with reference to the drawings. However, it goes without saying that the present disclosure is not limited to such examples. Those skilled in the art will appreciate that various modification examples, correction examples, substitution examples, addition examples, deletion examples, and equivalent examples can be conceived within the scope described in the claims and it is understood that those are also within the technical scope of the present disclosure. Further, respective constituent elements in the various embodiments described above may be arbitrarily combined within the scope not deviating from the gist of the invention.

In the first embodiment and the modification example thereof described above, it is exemplified that the detection target in the captured image of the cameras 10, 10a, ... is a vehicle, but the detection target is not limited to the vehicle, and other objects (for example, moving object such as vehicles) may be used. The other object may be, for example, a flying object such as a drone operated by a person such as a suspect who has caused an incident or the like. That is, the vehicle detection system according to the embodiment can be said to be an investigation assist system that assists detection of a vehicle or other objects (that is, detection targets).

The present disclosure is useful as a vehicle detection system and a vehicle detection method which efficiently reduces the time and effort spent on narrowing down a vehicle get away from an intersection where many people and vehicles come and go and assists and early detection of a suspect or a criminal of the incident or the like when an incident or the like occurs at the intersection.

The present application is based upon Japanese Patent Application (Patent Application No. 2018-196777) filed on Oct. 18, 2018, the contents of which are incorporated herein by reference.

What is claimed is:

1. A vehicle detection system, comprising:
a server connected to communicate with a plurality of cameras installed at each of a plurality of intersections; and
a client terminal connected to communicate with the server, wherein
the client terminal is configured to display, on a display device, a visual feature of each of a plurality of vehicles passing through a first intersection at a location and map data indicating a passing direction of the each of the plurality of vehicles passing through the first intersection and send, in response to a designation of any one of the plurality of vehicles, an instruction to set the designated vehicle as a tracking target vehicle to the server,
the server is configured to, when the instruction is received, specify an entry direction at a second intersection at which the tracking target vehicle is highly likely to enter next based on at least a passing direction of the tracking target vehicle at the first intersection and send the entry direction at the second intersection to the client terminal, and
the client terminal is configured to, when the entry direction at the second intersection is received,
display, on the display device, a position of the second intersection;
automatically set the entry direction at the second intersection as a search condition of a search request to be performed on the tracking target vehicle at the second intersection; and
send the next request to the server to search vehicles passing through the second intersection based on the search request.

2. The vehicle detection system according to claim 1, wherein the server is configured to store the entry direction at the second intersection in a storage as information indicating a travelling route of the tracking target vehicle.

3. The vehicle detection system according to claim 1, wherein the server is configured to specify the entry direction at the second intersection at which the tracking target vehicle is highly likely to enter next, based on a current time, the passing direction of the tracking target vehicle passing at the first intersection, and a distance from the first intersection.

4. The vehicle detection system according to claim 1, wherein the client terminal is configured to send an acquisition request for a captured image of a second camera at the second intersection to the server when the second camera corresponding to the entry direction at the second intersection is designated by a user's operation, and display, on the display device, the captured image of the second camera sent from the server in response to the acquisition request.

5. The vehicle detection system according to claim 4, wherein the client terminal is configured to display a direction in which the tracking target vehicle enters on the display identifiably.

6. The vehicle detection system according to claim 1, wherein the client terminal is configured to send the instruction to the server when map data indicating a passing direction of any one of the plurality of vehicles passing through the intersection is designated by a user's operation.

7. The vehicle detection system according to claim 1, wherein the client terminal is configured to send the instruction to the server when a visual feature of any one of the plurality of vehicles is designated by a user's operation.

8. The vehicle detection system according to claim 1, wherein the client terminal is configured to display, on the display device, a passing direction of the tracking target vehicle, which passes through the first intersection, to be superimposed on the map data identifiably.

9. The vehicle detection system according to claim 1, wherein the client terminal is configured to display a color of an icon of a camera corresponding to the entry direction at the second intersection differently from icons of cameras other than the camera corresponding to the entry direction at the second intersection.

10. The vehicle detection system according to claim 1, wherein the client terminal is configured to blink and display an icon of a camera corresponding to the entry direction at the second intersection.

11. The vehicle detection system according to claim 1, wherein the client terminal is configured to display, on the display device, a visual feature of the tracking target vehicle to be superimposed on the periphery of the intersection of the map data identifiably.

12. The vehicle detection system according to claim 1, wherein the server is configured to acquire road information of an area including the plurality of intersections, and specify a second camera at the second intersection where the tracking target vehicle is highly likely to enter next based on a current time, a passing direction of the tracking target vehicle passing through the first intersection, and road information of the area.

13. The vehicle detection system according to claim 12, wherein the road information of the area includes traffic jam information of a road.

14. The vehicle detection system according to claim 12, wherein the road information of the area includes construction information of a road.

15. The vehicle detection system according to claim 12, wherein the road information of the area includes one-way traffic information of a road.

16. The vehicle detection system according to claim 1, wherein
the client terminal is configured to send, in response to input of information including date and time and a location at which an incident occurred and a feature of a vehicle which caused the incident, an information acquisition request for a vehicle passing through the intersection at the location at the date and time to the server, the server is configured, when the information acquisition request is received, to extract vehicle information and passing directions of a plurality of vehicles passing through the intersection at the location in association with each other using a captured image of a camera corresponding to the intersection of the location at the date and time, and send the extracted result to the client terminal, and the client terminal is configured to display, on the display device, the visual features of the plurality of vehicles passing through the intersection at the location and passing directions of the respective vehicles in association with each other using the extracted result.

17. A vehicle detection method implemented by a vehicle detection system which includes a server connected to communicate with a plurality of cameras installed at each of a plurality of intersections and a client terminal connected to communicate with the server, the method comprising:

displaying, by the client terminal, on a display device, a visual feature of each of a plurality of vehicles passing through a first intersection at a location and map data indicating a passing direction of the each of the plurality of vehicles having passed through the first intersection, and sending, in response to a designation of any one of the plurality of vehicles, an instruction to set the designated vehicle as a tracking target vehicle to the server;

specifying, by the server when the instruction is received, an entry direction at a second intersection at which the tracking target vehicle is highly likely to enter next based on at least a passing direction of the tracking target vehicle at the first intersection and sending the entry direction at the second intersection to the client terminal; and in response to the entry direction at the second intersection being received by the client terminal,
  displaying, by the client terminal, on the display device, a position of the second intersection;
  automatically setting, by the client terminal, the entry direction at the second intersection as a search condition of a search request to be performed on the tracking target vehicle at the second intersection; and
  sending, by the client terminal, the next request to the server to search vehicles passing through the second intersection based on the search request.

* * * * *